(12) United States Patent
Baer et al.

(10) Patent No.: US 11,775,911 B2
(45) Date of Patent: Oct. 3, 2023

(54) METHOD AND APPARATUS FOR PROVIDING PREDICTIONS OF KEY PERFORMANCE INDICATORS OF A COMPLEX MANUFACTURING SYSTEM

(71) Applicant: Siemens Aktiengesellschaft, Munich (DE)

(72) Inventors: Felix Baer, Fuerth (DE); Niklas Buerger, Nuremberg (DE); Hans-Henning Klos, Weigendorf (DE); Christoph Paulitsch, Karlsruhe (DE); Jens Schnittger, Lonnerstadt (DE)

(73) Assignee: Siemens Aktiengesellschaft, Munich (DE)

( * ) Notice: Subject to any disclaimer, the term of this patent is extended or adjusted under 35 U.S.C. 154(b) by 39 days.

(21) Appl. No.: 17/609,852

(22) PCT Filed: Mar. 27, 2020

(86) PCT No.: PCT/EP2020/058743
§ 371 (c)(1),
(2) Date: Nov. 9, 2021

(87) PCT Pub. No.: WO2020/224869
PCT Pub. Date: Nov. 12, 2020

(65) Prior Publication Data
US 2022/0230117 A1    Jul. 21, 2022

(30) Foreign Application Priority Data

May 9, 2019  (EP) ..................... 19173418

(51) Int. Cl.
*G06Q 50/04*     (2012.01)
*G06Q 10/0639*   (2023.01)
*G06Q 10/0633*   (2023.01)

(52) U.S. Cl.
CPC ... *G06Q 10/06393* (2013.01); *G06Q 10/0633* (2013.01); *G06Q 10/06395* (2013.01); *G06Q 50/04* (2013.01)

(58) Field of Classification Search
CPC ......... G06Q 10/06393; G06Q 10/0633; G06Q 10/06395; G06Q 50/04
See application file for complete search history.

(56) References Cited

U.S. PATENT DOCUMENTS 6,970,841 B1 * 11/2005 Cheng .................. G06Q 20/203
                                                    705/28
10,481,579 B1 * 11/2019 Putman .............. G06Q 10/0633
(Continued)

FOREIGN PATENT DOCUMENTS

CN      108711035 A  * 10/2018
EP        3316198 A1    5/2018

OTHER PUBLICATIONS

Kang et al. "A Hierarchical structure of key performance indicators for operation management and continuous improvement in production systems" (2016) (https://tsapps.nist.gov/publication/get_pdf.cfm?pub_id=919754) (Year: 2016).*

*Primary Examiner* — Sujay Koneru
(74) *Attorney, Agent, or Firm* — Laurence A. Greenberg; Werner H. Stemer; Ralph E. Locher

(57) ABSTRACT

A method provides predictions of key performance indicators of a product variant of a product family manufactured by a complex manufacturing system in a manufacturing process. The method provides a manufacturing operation model for each manufacturing operation type used to manufacture a product variant of the product family. Via the complex manufacturing system measured contributions to key performance indicators, process context data and process execution data of manufacturing operations, are provided. The model parameters of the provided manufacturing operation models are learned automatically based on collected process context data, collected process execution data, and measured contributions to key performance indicators, to update the manufacturing operation models. An updated production efficiency model combining updated manufacturing models including the updated manufacturing operation models, to calculate the predictions of the key performance indicators, of the product variant, to be manufactured, depending on a product configuration of the respective product variant, is evaluated.

12 Claims, 9 Drawing Sheets

(56) References Cited

U.S. PATENT DOCUMENTS

| | | | | |
|---|---|---|---|---|
| 2007/0282576 | A1* | 12/2007 | Butine | G06Q 10/06 |
| | | | | 703/6 |
| 2009/0281845 | A1* | 11/2009 | Fukuda | G06Q 10/06393 |
| | | | | 705/7.39 |
| 2010/0106280 | A1* | 4/2010 | Hansen | G06Q 50/04 |
| | | | | 706/46 |
| 2012/0253865 | A1* | 10/2012 | Narasimhamurthy | |
| | | | | G06Q 10/0631 |
| | | | | 705/7.12 |
| 2013/0006408 | A1* | 1/2013 | Zakrzwski | G06Q 10/0875 |
| | | | | 700/107 |
| 2013/0159209 | A1* | 6/2013 | Zhao | G06Q 30/02 |
| | | | | 705/348 |
| 2013/0318493 | A1* | 11/2013 | Krueger | G06F 8/20 |
| | | | | 717/104 |
| 2016/0162607 | A1* | 6/2016 | Callahan | G06F 30/00 |
| | | | | 703/1 |
| 2016/0189081 | A1* | 6/2016 | Gajdzinski | G06Q 10/06393 |
| | | | | 705/7.39 |
| 2017/0200121 | A1* | 7/2017 | DiPippo | G06Q 10/06315 |
| 2018/0123909 | A1* | 5/2018 | Venkitapathi | H04L 41/5009 |
| 2019/0188854 | A1* | 6/2019 | Mohiuddin Khan | G06T 7/13 |
| 2019/0347593 | A1* | 11/2019 | Norman | G06Q 10/06311 |
| 2020/0293910 | A1* | 9/2020 | Kate | G06N 5/022 |

* cited by examiner

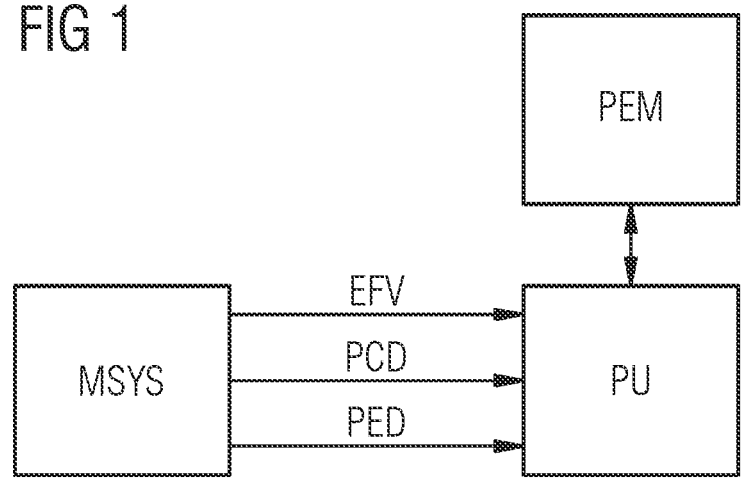
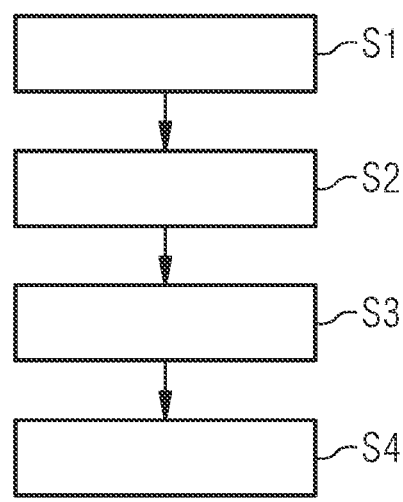

FIG 4
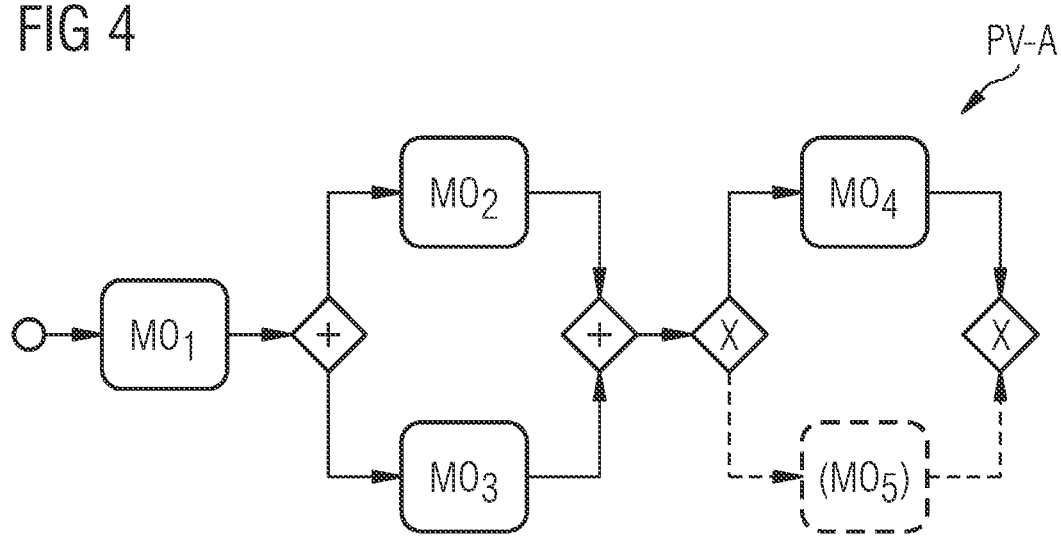
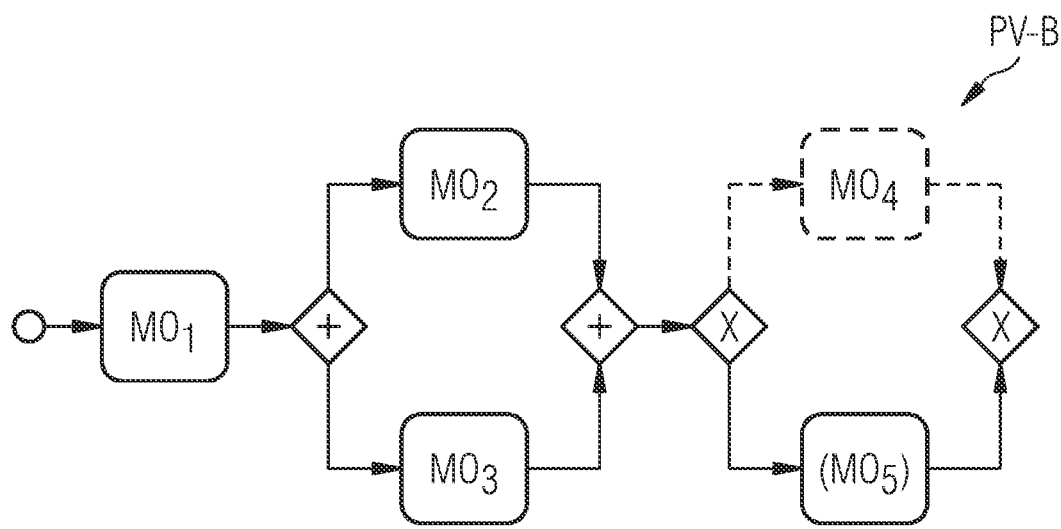

PV-A with M04 3-axis milling

PV-A with M05 5-axis milling

METHOD AND APPARATUS FOR PROVIDING PREDICTIONS OF KEY PERFORMANCE INDICATORS OF A COMPLEX MANUFACTURING SYSTEM

FIELD AND BACKGROUND OF THE INVENTION

The invention relates to a computer-implemented method and apparatus for providing predictions of key performance indicators, KPI, of a product variant PV of a product family to be manufactured by a complex manufacturing system in a manufacturing process.

Complex manufacturing systems are currently facing various challenges related to a strong demand for configurable and even customizable products, short delivery times and reduced production costs. As a consequence, adaptable and flexible manufacturing systems arise, where fixed work schedules and machine assignments are not possible anymore. However, the complexity of these adaptable and flexible manufacturing systems also represents a major challenge for the efficiency estimation, because a correct assessment of efficiency related key performance indicators for different product variants PV of a product family cannot be performed easily. The term "efficiency" is used here as a placeholder for a wide range of possible indicators that are of interest for production control. The indicators can be as diverse manifestations of greenness, production costs and/or production time.

While traditional production efficiency models can be used for rigid production execution flows and predefined work schedules, they reach their limits when it comes to flexible complex manufacturing systems, which are used to produce small lots of different product variants PV within a product family PF of a product.

SUMMARY OF THE INVENTION

Accordingly, it is an objective of the present invention to provide a method and apparatus which provide predictions of key performance indicators of a complex manufacturing system to increase the production efficiency of such a complex manufacturing system, and/or provide support for the manufacturer for deciding whether the production of a certain product variant PV is technically viable and can be performed efficiently.

This objective is achieved according to a first aspect of the present invention by a computer-implemented method comprising the features of the independent method claim.

The invention provides according to a first aspect a computer-implemented method for providing predictions of key performance indicators KPI of a product variant PV of a product family PF manufactured by a complex manufacturing system MSYS in a manufacturing process MP, wherein the method comprises the steps of:

providing a manufacturing operation model MOpM for each manufacturing operation type MOT used to manufacture a product variant PV of the product family PF, providing, using measurements as well as functions of the complex manufacturing system, key performance indicators, process context data PCD, and process execution data PED of manufacturing operations MO which can be collected during manufacturing processes MP having been executed to manufacture product variants PV of the same product family PF, learning automatically model parameters of the provided manufacturing operation models MOpMs based on collected process context data PCD and collected process execution data PED and measured contributions to key performance indicators to update the manufacturing operation models MOpMs and evaluating an updated production efficiency model PEM combining updated manufacturing models, MM, including the updated manufacturing operation models MOpM', to calculate the predictions of the key performance indicators of the product variant PV to be manufactured by said complex manufacturing system MSYS depending on a product configuration of the respective product variant PV.

The production efficiency model PEM includes manufacturing models, MM. Each manufacturing model MM is a priori product variant PV specific and comprises the manufacturing operation models MOpM of the respective product variant PV and composition rules indicating how efficiency contributions have to be combined to calculate a total efficiency key performance indicator KPI for the product variant PV and a given production process. Generally, however, many product variants PV differ only by the process execution data PED of their manufacturing operations MO and the same composition rule can be applied. A manufacturing model MM can therefore be viewed as applying actually to whole classes of product variants PV. A given manufacturing operation model MOpM can be used by many different manufacturing models MM of different product variants PV involving the same manufacturing operation type MOT (possibly with different execution parameters, called process execution data PED in the following). The information on which manufacturing operations MO and therefore which manufacturing operation models MOpM must be included in a given manufacturing model MM is provided by the Bill of Process BoP and can be transmitted automatically for example by a product lifecycle management system PLM.

The key performance indicators KPI functionally depend on said process execution data PED for the manufacturing of the product variant PV. Process execution data PED comprise all data necessary to describe the physical execution of a manufacturing operation MO, or when used at the level of the production of an entire product variant PV, the physical execution of all manufacturing operations MO involved in the production process. They are part of the process description in the Bill of Process BoP and the Bill of Materials BoM. For example, PED may include geometric data such as depth and width of a borehole to be drilled, material volumes processed, or environmental conditions such as required temperature. These data can be manually or automatically extracted from the Bill of Materials (BOM) and the Bill of Process (BoP) underlying the production process. They are assumed to be available in the complex manufacturing system MSYS. Actual PED as observed in the real life production process may slightly differ from these specified PEDs. The present method automatically deals with such differences, whether of a systematic or a stochastic nature, by measuring the real life values of the key performance indicators KPI against the specified PED. In this way, the (partially stochastic) relationship between specified PED and KPI is obtained. Only the specified PED, not their randomly fluctuating real life counterparts, are generally under the control of the complex manufacturing system MSYS and the human production manager, and therefore it is this map that needs to be established for realizing said first aspect. However, where real life PED may differ strongly from specifications and are measurable, the complex manufacturing system MSYS can be configured to use these instead of the specified values.

In a possible embodiment of the computer-implemented method according to the first aspect of the present invention, the provided process context data collected during a manufacturing process to manufacture a product variant PV of the same product family PF comprises a sequence and structure of the manufacturing operations performed during the respective manufacturing process, a configuration of the product variant PV manufactured by the sequence of manufacturing operations and time context data indicating a time when the manufacturing process, of the product variant PV of the same product family PF was executed.

In a possible embodiment of the computer-implemented method according to the first aspect of the present invention, the PED of the manufacturing operation model may comprise continuous and/or discrete variables.

In a possible embodiment of the computer-implemented method according to the first aspect of the present invention, the key performance indicators provided by the manufacturing execution system of the complex manufacturing system are derived from measurement data provided by sensors and/or measurement devices of the complex manufacturing system.

In a still further possible embodiment of the computer-implemented method according to the first aspect of the present invention, the sequence and structure of the manufacturing operations forming part of the process context data are provided by a product lifecycle management system of the complex manufacturing system.

In a possible embodiment of the computer-implemented method according to the first aspect of the present invention, learning of the model parameters of the manufacturing operation models is performed in a training phase using neural networks, decision trees or a support vector machine.

In a possible embodiment of the computer-implemented method according to the first aspect of the present invention, the model parameters are adapted iteratively by performing a regression procedure.

In a possible embodiment of the computer-implemented method according to the first aspect of the present invention, the neural network comprises a feedforward neural network.

In a possible embodiment of the computer-implemented method according to the first aspect of the present invention, the neural network comprises a recurrent neural network.

In a possible embodiment of the computer-implemented method according to the first aspect of the present invention, the key performance indicators predicted for different product variants PV of the same product family PF are evaluated to provide a criterion which can be used in the selection of a production variant PDV and/or a product variant PV manufactured by the complex manufacturing system MSYS, as follows:

If there are for a given product variant different production variants PDV, relevant key performance indicators, $\widehat{KPI}$, are predictively calculated for all production variants PDV and an optimal production variant PDV for producing the respective product variant can be determined.

On the other hand, different product variants each with its optimal production variant PDV can be evaluated with respect to the relevant key performance indicators, KPI, and can be compared with each other. The manufacturer can then decide based on the comparison result whether some product variants PV cannot be produced with sufficient efficiency and may omit production of these product variants PV.

In a possible embodiment of the computer-implemented method according to the first aspect of the present invention, the manufacturing process comprises one or more manufacturing process cycles providing data combined to adapt the model parameters of the manufacturing operation model or used to adapt the model parameters of the manufacturing operation model for each manufacturing process cycle.

The invention further provides according to a further aspect a prediction apparatus configured to calculate predictions (KPI) for key performance indicators KPI of product variants PV of a product family PF to be produced by a complex manufacturing system MSYS comprising the features of the independent system claim.

The invention provides according to the second aspect a prediction apparatus adapted to provide predictions $\widehat{KPI}$ for key performance indicators KPI of product variants PV of a product family PF to be produced by a complex manufacturing system MSYS providing, using measurements as well as functions of the complex manufacturing system, key performance indicators, process context data and process execution data of manufacturing operations collected during manufacturing processes executed to manufacture product variants PV of a product family PF, said prediction apparatus comprising a processing unit adapted to process the key performance indicators, process context data and process execution data to learn automatically model parameters of manufacturing operation models of manufacturing operation types used to manufacture product variants PV of the same product family PF to update the manufacturing operation models MOpM and further adapted to evaluate an updated production efficiency model combining updated manufacturing models MOpM including the updated manufacturing operation models MOpM to calculate predictions $\widehat{KPI}$ of the key performance indicators of a product variant PV to be manufactured by said complex manufacturing system MSYS depending on a product configuration of said product variant PV.

In a possible embodiment of the complex manufacturing system according to the second aspect of the present invention, the key performance indicators predicted for different product variants PV of the same product family PF are evaluated to assist in the selection of a specific production variant PDV and/or product variant PV to be manufactured by said complex manufacturing system MSYS.

It is mandatory to introduce a production efficiency model PEM capable of representing relevant structures of all product variants PV and corresponding manufacturing production variants PDV. With such a production efficiency model, it is possible to assess if a product variant PV can be produced within desired efficiency ranges, for instance with competitive costs. An analysis based on the production efficiency model PEM makes the different contributions to the total production efficiency transparent, especially the dominant contributions. In the case of production costs, this corresponds to the cost-by-cause principle. The reason why conventional cost models are not incorporating the cost-by-cause principle in a satisfactory way relates to the fact that overhead costs are distributed based on estimated sales figures for each product variant PV which may result in wrong numbers if an incorrect estimate for those figures is used. Furthermore, some of those overhead costs are actually direct costs which are only handled as overhead costs because the accurate assessment of their relevant information is considered to be too expensive. Typical examples are the exact energy consumption for each manufacturing operation, or the degree of wear and tear that is associated with a manufacturing operation. The direct cost or production efficiency assessment for those examples is difficult because the processing time and resource allocation for a manufacturing operation depends on the assigned manufacturing resource and production configuration.

The proposed production efficiency model PEM used by the method and apparatus according to the present invention addresses, when applied to productions costs, these challenges with a more accurate cost-by-cause-oriented cost structure and the enhancement of its transparency. In addition, it also aims at improving the accuracy of the model itself.

An overall goal of the proposed method and apparatus is to determine the production efficiency for each product variant PV with as little effort as possible in order to achieve the following two main benefits:

an automatic selection of the most efficient production variant PDV for a given product variant PV so that no human intervention is needed and the physical production system follows commands issued by the proposed computer-implemented program;

an automatic assessment if, with the best possible choice of production variant PDV, the product variant PV considered can be produced with sufficient efficiency with respect to some set of configured key performance indicators KPIs. In the absence of such a possibility, the system can issue a warning to a production manager and may not automatically accept the production order.

Moreover, the analysis provided by the present functionality according to the present invention can be used to determine economic and technical viability of production and to provide a valid foundation for product pricing.

The method according to the present invention can start with measurements for product variants PV that have already been produced. These results can be used to make estimations also for product variants PV of the same product family PF that have not yet been produced at all.

In summary, the setting is that of an agile manufacturing, with a very high number of different possible product variants PV (each of which may occur with low frequency and in small quantities per order), which share some materials and production operations but differ in others.

A first core problem overcome by the method according to the present invention is that currently it is not possible to make transparent (cost by cause principle) the production efficiency structures. The second core problem overcome by the method according to the present invention is that currently it is not possible to automatically learn and update the parameters of a production efficiency model used by agile manufacturing systems.

In the following, possible embodiments of the different aspects of the present invention are described in more detail with reference to the enclosed figures.

BRIEF DESCRIPTION OF THE FIGURES

FIG. 1 shows a schematic diagram for illustrating a complex manufacturing system according to an aspect of the present invention;

FIG. 2 shows a flowchart of a possible exemplary embodiment of a computer-implemented method according to the present invention;

FIG. 4 shows a further schematic diagram for illustrating the operation of the method and system according to the present invention;

DETAILED DESCRIPTION OF THE INVENTION

Figure 5:
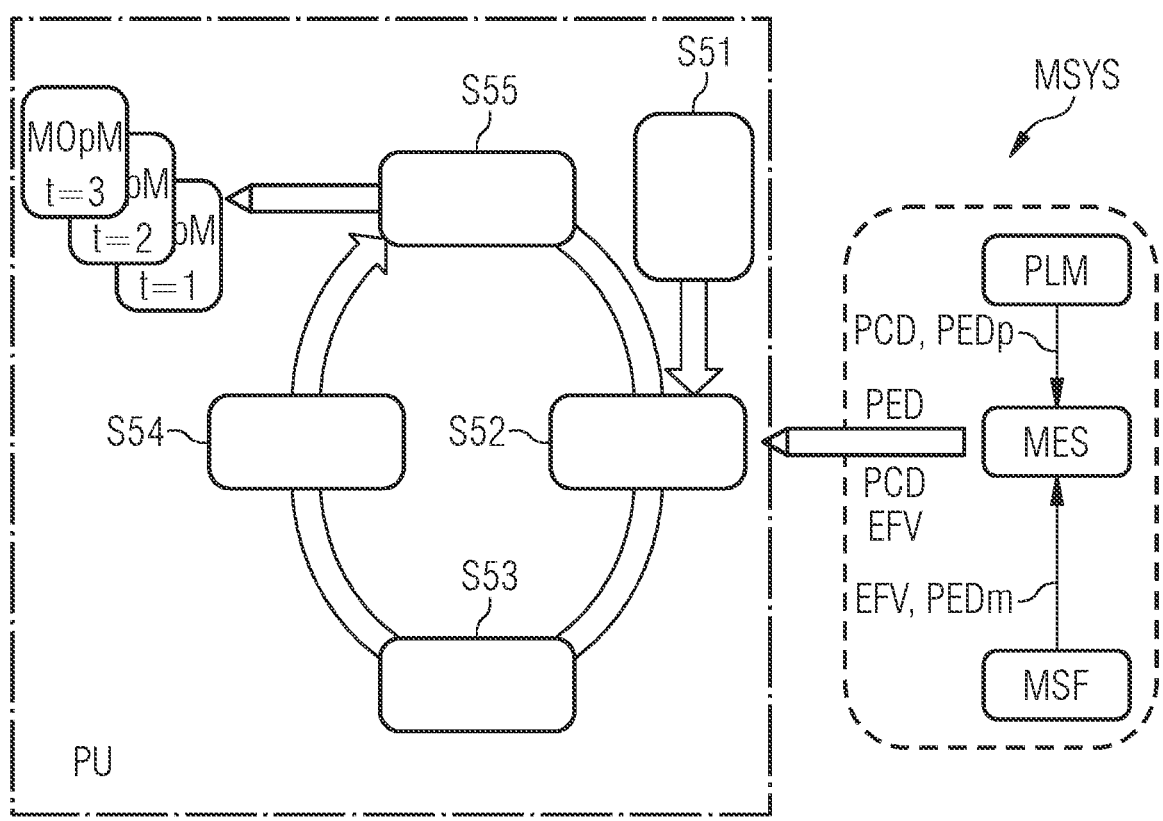
FIG. 5 shows a further schematic diagram for illustrating a recursive adaption process performed in a possible implementation of the method and system according to the present invention.
Figure 15:
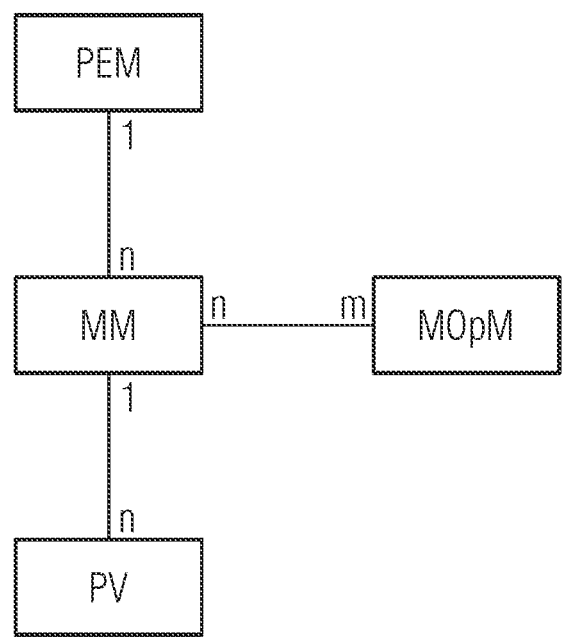

As can be seen from the schematic diagram of FIG. 1, a complex manufacturing system MSYS can be extended and can comprise a processing unit PU receiving manufacturing operation MO specific contributions to key performance indicators KPI, i.e. efficiency function values EFV, process context data PCD and process execution data PED of manufacturing operations MO collected during manufacturing processes executed to manufacture product variants PV of the same product family PF. The received manufacturing operation MO specific contributions to key performance indicators KPI (EFV) relate to individual manufacturing operations MO. They form contributions to key performance indicators KPI of the manufactured product variant PV. The processing unit PU has access to manufacturing operation models MOpM and manufacturing models MMs and can process the received manufacturing operation MO specific contributions to key performance indicators KPI (efficiency function values EFVs), the received process context data PCD and the received process execution data PED to learn automatically model parameters of the manufacturing operation models MOpM provided for different manufacturing operation types MOT used to manufacture a product variant PV of the same product family PF to update the respective manufacturing operation models MOpM as also illustrated in FIG. 5. The processing unit PU is further adapted to use the updated manufacturing operation models MOpM to calculate predictions of key performance indicators $\widehat{KPI}$ for one or more product variants PV to be manufactured by the complex manufacturing system MSYS depending on a product configuration of the respective product variant PV. The processing unit PU can evaluate a production efficiency model PEM, which includes manufacturing models MM as also illustrated by the UML diagram of FIG. 15. Each manufacturing model MM of one or more product variants PV is related to the manufacturing operation models MOpM involved in the respective product variant PV as also illustrated in FIG. 15. The manufacturing model MM also comprises rules defining how efficiency contributions are combined to calculate a total efficiency KPI for a set of product variants PV and a given production process. Each manufacturing model MM is updated by updating its manufacturing operation models MOpM. The production efficiency model PEM is updated by updating the manufacturing models MM. The updated production efficiency model PEM is evaluated to calculate the predictions of efficiency key performance indicators $\widehat{KPI}$ of one or more product variants PV. The key performance indicators $\widehat{KPI}$ predicted for different product variants PV of the same product family PF can then be further analyzed or evaluated to provide a selection criterion which can be used to assist in the selection of a specific production variant PDV and/or product variant PV which is then manufactured by the complex manufacturing system MSYS.

The observed key performance indicator contributions EFV (efficiency function values) provided by the complex manufacturing system MSYS can comprise a variety of different key performance indicator contributions such as manufacturing time required to produce the respective product variant PV or the required resources consumed during the manufacturing process for producing the respective product variant PV. The process context data PCD comprises metadata which can be assigned to individual process steps of the production process. The process context data PCD can comprise data indicating product variants PV for which the respective process step or manufacturing operation MO has been used. Further, the process context data PCD can comprise data about the process consisting of a sequence of involved process or manufacturing steps employed for manufacturing the respective product variant PV. The process execution data PED comprise data which describe the execution of process or manufacturing steps in a quantitative manner, for example the depth of a drilling hole or the width of a drilling hole in case of a drilling manufacturing step. The process execution data PED form the basis for calculating the impact on key performance indicators KPI. The manufacturing operation model MOpM describes a manufacturing operation type MOT together with contributions to key performance indicators KPIs from that manufacturing operation type, as a function of the process execution data PED for any concrete manufacturing operation MO of that manufacturing operation type MOT.

The complex manufacturing system MSYS is adapted to manufacture one or more product families PF wherein each product family PF comprises a collection of product variants PV which differ slightly in their configuration. These differences may occur in the process execution data PEDs for common manufacturing operation types MOTs, and also in the manufacturing operation types MOTs involved themselves. By definition of a product family PF, different product variants PV will share almost all of the manufacturing operation types MOTs involved, while the PED for shared manufacturing operation types MOTs may be quite different between the product variants PV. For instance, a product variant PV could differ from another product variant PV of the same product family PF by two manufacturing operation types MOTs within a total of hundred manufacturing operation types. The method allows to transform measurement information for specific values of the PED to other values of the PEDs for the same manufacturing operation types MOTs.

Accordingly, there is a high degree of reusable information which can be derived from explicit measurements performed during manufacturing steps during production of previously produced product variants PV of the same product family PF. Thus, instead of having to measure manufacturing operation MO specific contributions to KPIs explicitly for each and every product variant PV—impossible or enormously cumbersome in practice due to the vast number of possibilities to choose and combine feature options within a product family PF—the method according to the present invention allows to reliably estimate KPIs for a large number of product variants PV not yet produced on the basis of measurements for a relatively small number of actually produced product variants PV. A small number of measurements for each manufacturing operation type MOT—regardless of the product variant PV context in which they occurred—suffices to generate KPI predictions for any not yet produced product variant PV involving these same manufacturing operation types MOTs but with arbitrary, generally different, process execution data PED.

The method and system according to the present invention uses a production efficiency model PEM including product variant PV specific manufacturing models MM. The production efficiency model PEM can represent KPI structures for different product variants PV and the corresponding manufacturing process variants. For instance, with the production efficiency model PEM, it is possible to assess if a product variant PV can be produced with competitive efficiency. The analysis performed by the processing unit PU based on the production efficiency model PEM can make transparent the different contributions to the total production efficiency (generalized cost-by-cause-principle), especially the dominant contributions. Reliable and precise knowledge of the predicted key performance indicators $\widehat{KPI}$ can also be used to optimize the production process. The method and system according to the present invention allows to determine predicted key performance indicators $\widehat{KPI}$ for each product variant PV requiring comparatively small computational resources in order to assess viability of production. At a basic level, the system according to the present invention uses measurements performed for different product variants PV having been produced by the complex manufacturing system MSYS in the past. The processing unit PU can make estimations or predictions also for product variants PV that have not yet been produced by the manufacturing system MSYS. A learning algorithm is employed for updating the manufacturing operation models MOpM. The method according to the present invention can be used in a complex manufacturing system MSYS with a very high number of different possible product variants PV wherein each product variant PV may occur with a low frequency and in small quantities or lots per order and wherein the product variants PV share some materials and production operations but may differ in other production operations and/or materials.

FIG. 2 shows a possible exemplary embodiment of a computer-implemented method according to an aspect of the present invention. In the illustrated flowchart, the computer-implemented method is used for providing predictions of key performance indicators KPI of a product variant PV of a product family PF to be manufactured (in the future) by a complex manufacturing system MSYS in a manufacturing process MP. In the illustrated exemplary embodiment, the computer-implemented method comprises four main steps S1, S2, S3, S4.

In a first step S1, a manufacturing operation model MOpM is provided for each manufacturing operation type MOT used to manufacture a product variant PV of a product family PF.

In a further step S2, the complex manufacturing system MSYS provides measured key performance indicator contributions EFV, process context data PCD as well as process execution data PED of manufacturing operations MO which can be collected during manufacturing processes MP having been executed to manufacture other product variants PV of the same product family PF.

In a further step S3, model parameters p of the provided manufacturing operation models MOpM are automatically learned based on the collected process context data PCD and the collected process execution data PED as well as the measured manufacturing operation MO specific contributions to key performance indicators KPI, i.e. efficiency function values EFVs, to update the manufacturing operation models MOpM. Such measurements may use data from suitable sensors or suitable devices (e.g. energy meter for contribution to energy KPI), if present on the manufacturing shop floor MSF of the complex manufacturing system MSYS in order to determine KPI values automatically.

In a final step S4, the updated production efficiency model PEM combining the updated manufacturing models MM, which in turn include the updated manufacturing operation models MOpM', is evaluated to calculate the predictions $\widehat{KPI}$ about the key performance indicators of the respective product variant PV to be manufactured by said complex manufacturing system MSYS depending on a product configuration of the respective product variant PV.

The measured, observed or derived manufacturing operation MO specific contributions to key performance indicators KPI are provided as efficiency function values EFVs by the complex manufacturing system MSYS as also illustrated in the block diagram of FIG. 1. In a possible embodiment, the manufacturing operation MO specific contributions to key performance indicators KPI and the process execution data PED are provided by a manufacturing execution system MES of the complex manufacturing system MSYS. The manufacturing operation MO specific contributions to key performance indicators KPI (i.e. efficiency function values EFVs) are provided by measurements as well as functions of the complex manufacturing system MSYS. The value of each KPI contribution is determined according to the definition of the KPI based on measurements. The observed manufacturing operation MO specific contributions to key performance indicators KPI provided by such a manufacturing execution system MES of the complex manufacturing system MSYS can be derived from measurement data or sensor data provided by sensors of the complex manufacturing system MSYS. The observed manufacturing operation MO specific contributions to key performance indicators KPI, i.e. efficiency function values EFVs, can relate to a variety of different indicators, for instance the duration of production steps applied during manufacturing of the product variant PV.

The process context data PCD collected during a manufacturing process MP to manufacture a product variant PV of the same product family PF can comprise in a possible embodiment a sequence and structure of the manufacturing operations MO performed during the respective manufacturing process MP, a configuration of the product variant PV manufactured by the sequence of manufacturing operations MO and in a possible embodiment, also time context data indicating a time when the manufacturing process MP of the product variant PV of the same product family PF has been executed by the manufacturing system MSYS. The sequence and structure of manufacturing operations MO forming part of the process context data PCD can be provided in a possible embodiment by a product lifecycle management PLM system of the complex manufacturing system MSYS. The composition rules of the manufacturing models MM that determine how the complete key performance indicator KPI for a given product variant PV is obtained from the manufacturing operation MO specific contributions EFV depend in general not only on the type of key performance indicator KPI, but can also depend on the structure of the manufacturing process MP, in particular on said sequence and structure of manufacturing operations MO. For instance, for a key performance indicator KPI representing the total duration of manufacturing a certain product variant PV, durations for parallel manufacturing operations MO involved in the production of that product variant PV must be treated differently from durations for sequential manufacturing operations MO for that same product variant PV. The composition rules used by the manufacturing models MM relate to classes of key performance indicators KPI and classes of manufacturing processes MP that can be treated in the same way regarding the composition of manufacturing operation MO specific contributions to the complete key performance indicator KPI. In the simplest case, in particular for the class of key performance indicators KPI which is obtained by a simple sum of the manufacturing operation MO specific contributions, there is no dependency on the sequential structure of the manufacturing operations MO within the manufacturing process MP. Said composition rules have to be configured manually, but because they apply to entire classes of key performance indicators KPI and manufacturing processes MP, there will be only a limited number of them. In particular, the composition rules generally do not depend on the production variant PV specific process execution data PED of the manufacturing operations MO.

The observed key performance indicator contributions (i.e. the efficiency function values EFV), the process context data PCD and the process execution data PED of the manufacturing operations MO can be collected during manufacturing processes having been executed to manufacture product variants PV of the same product family PF in step S2.

After that, model parameters p of the provided manufacturing operation models MOpM are learned automatically based on the received observed key performance indicator contributions, the received process context data PCD and the received process execution data PED to update the stored manufacturing operation models MOpMs. The learning of the model parameters p of the manufacturing operation models MOpM in step S3 comprises in a possible embodiment an iterative adaption of the model parameters p. The learning can be performed in a training phase in a variety of ways.

In a possible embodiment, the model parameters p can be adapted iteratively by performing a regression procedure in step S3. In another embodiment, the model parameters p of the manufacturing operation models MOpM can be adapted iteratively by using a neural network NN or by using decision trees or by using a support vector machine SVM. The employed neural network NN can comprise in a possible embodiment a simple feedforward neural network. In another alternative embodiment, the used neural network can comprise a recurrent neural network RNN.

In step S4, the updated manufacturing operation models MOpM' are used to calculate the predictions of the key performance indicators $\widehat{KPI}$ of the product variant PV to be manufactured by the complex manufacturing system MSYS depending on the received input product configuration of the respective product variant PV. The update of manufacturing operation models MOpMs in step S3 leads to an update of the manufacturing model MM of the product variant PV, which in turn updates the production efficiency model PEM.

The key performance indicators $\widehat{KPI}$ predicted for different product variants PV of the same product family PF can be evaluated in advance to select a single (optimal) production variant PDV and/or one or more product variants PV to be manufactured by the machines of the manufacturing shop floor MSF of the complex manufacturing system MSYS in the following manufacturing process MP.

The manufacturing process MP can comprise one or more manufacturing process cycles providing data combined to adapt the model parameters p of the manufacturing operation model MOpM or used to adapt the model parameters p of the manufacturing operation model MOpM for each manufacturing process cycle.

Figure 3:
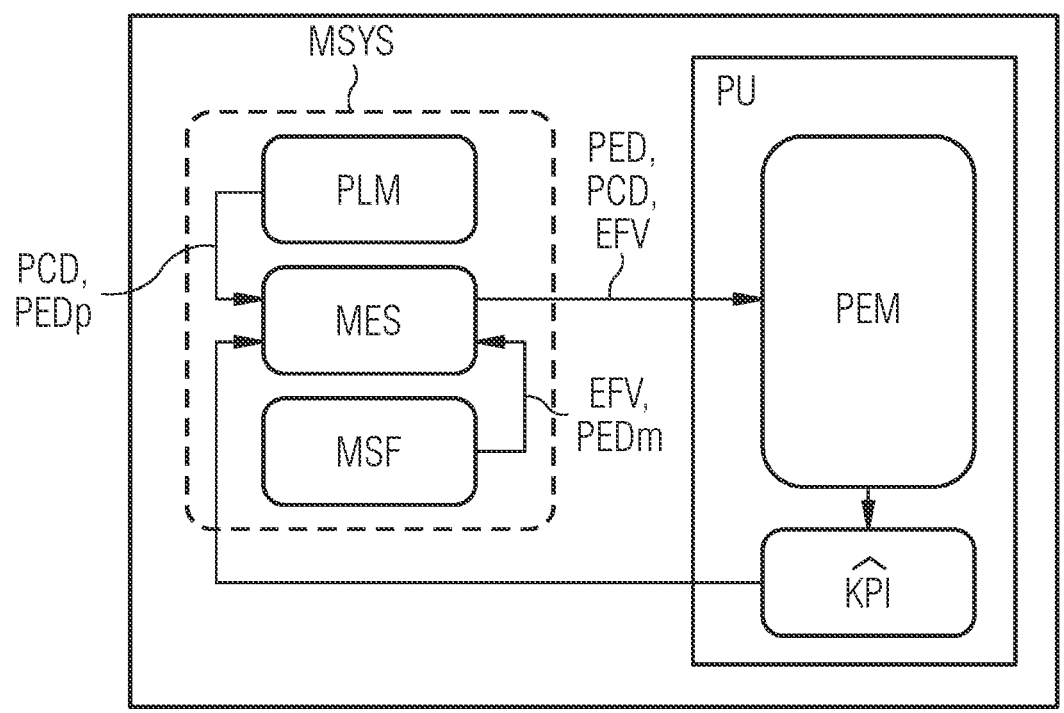
FIG. 3 shows a schematic diagram for illustrating a possible exemplary embodiment of a method and system according to the present invention.

FIG. 3 shows schematically a possible embodiment of a method and system according to the present invention. In the illustrated embodiment, the complex manufacturing system MSYS comprises a product lifecycle management system PLM and a manufacturing execution system MES receiving data from a manufacturing shop floor MSF of the manufacturing system. The processing unit PU is connected via data interfaces to the manufacturing execution system MES system as illustrated in FIG. 3. The manufacturing execution system MES gets process context data PCD and planned process execution data $PED_p$ from the product lifecycle management PLM. The manufacturing execution system MES receives efficiency function values EFV and possibly measured product execution data $PED_m$ from the manufacturing shop floor MSF. The manufacturing execution system MES relays process execution data PED, process context data PCD and efficiency function values EFV to the processing unit PU containing the manufacturing operations models MOpM and manufacturing models MM. The processing unit PU comprises one or more processors adapted to perform a computer-implemented method for providing predictions of key performance indicators $\widehat{KPI}$ as illustrated in the flowchart of FIG. 2. In a possible embodiment, the processing unit PU can first calculate, based on the manufacturing operation models MOpM, key performance indicator contributions for each manufacturing operation MO of the manufacturing process MP executed by the manufacturing execution system MES. Then the processing unit PU combines these contributions to predicted key performance indicators $\widehat{KPI}$, which can be evaluated for any product variant PV of interest, based on the manufacturing models MM. The employed manufacturing operation models MOpM and manufacturing models MM form part of the production efficiency model PEM which is used to calculate the efficiency KPIs of interest for all product variants PV. The results of such an efficiency assessment can then be output or displayed within the manufacturing execution system MES. The prediction is constructed from predictions of all manufacturing operation MO specific contributions to the KPI of interest, and therefore also these contributions can be displayed individually, for instance using a process notation based on data provided by the product lifecycle management PLM system.

FIG. 4 shows an execution flow diagram for the production of two different product variants PV-A, PV-B of the same product family PF. Different manufacturing operations MO can be performed in parallel and/or in series to manufacture a product of a specific product variant PV. In the example of FIG. 4, PV-A and PV-B differ not only by possibly different parametrizations of manufacturing operations MO1, MO2 and MO3, but also by the fact that PV-A uses manufacturing operation MO4 while PV-B uses manufacturing operation MO5.

The system can comprise a product lifecycle management PLM which holds product data and process planning data. A generic Bill of Process BoP and Bill of Materials BoM document can be provided, which describe a manufacturing process MP for all product variants PV of a product family PF, the corresponding manufacturing operations MO, data or information about the used manufacturing resources from a planned structure and the materials from the Bill of Materials BoM. The planned structure of the manufacturing shop floor MSF can comprise the manufacturing resources, in particular the employed manufacturing machines and tools of the manufacturing shop floor MSF which are required for manufacturing different product variants PV. The Bill of Materials BoM can be used for describing the different materials, parts and sub-assemblies for the complete product spectrum. The product lifecycle management PLM can comprise a product configurator which can be used to generate a product variant PV specific Bill of Process BoP and Bill of Materials BoM.

In advanced manufacturing plants, in particular Industry 4.0 type plants, there is generally more than one possibility for producing a given product variant PV and therefore more than one BoP. These may differ, for instance, in the technology used for a certain manufacturing step such as glueing instead of screwing parts together, or by a different definition of assembly steps, or simply of different machines with different production efficiency that can be used for one and the same production operation. The present concept admits the treatment of different production variants PDV, and all the considerations below apply equally to each production variant PDV.

The PED of the manufacturing operation model MOpM can comprise continuous and/or discrete variables, for example the depth and width of a borehole (continuous case) or the material type (discrete case). Continuous variables arise mainly in the machining, forming and casting domains, whereas discrete variables arise mainly in the joining domain. Some manufacturing operation types MOT can also involve both types of variables, i.e. continuous and discrete variables.

The manufacturing operation models MOpMs can comprise efficiency functions EF (for operations with continuous parameters) and these can depend on several process execution data PED such as processing time. The efficiency functions EF are modeled according to the physical nature of the process and according to the efficiency KPI of interest. They are indeed manufacturing operation type MOT specific contributions to the efficiency KPI of interest. They generally contain model parameters, the precise values of which are unknown and which are determined by the present method. For instance, if the efficiency KPI is energy consumption and it is known that the contribution to this KPI by the manufacturing operation type MOT considered depends linearly on the duration of the manufacturing operation MO, then the proportionality coefficient of this linear relation is the model parameter to be determined. Efficiency functions EF are thus defined at the level of a single manufacturing operation type MOT and should be viewed as the contribution from that MOT to the KPI of a certain product variant PV.

The MOpMs can also comprise a mapping table (for operations with discrete PED). In this case, there are no unknown model parameters to be determined, but the present method will still combine results for the same value of the PED, e.g. by forming an average.

For simplicity, the term "efficiency function" EF is actually used for both cases (discrete and continuous PED). Also, in this generalized sense, every efficiency function EF of a manufacturing operation model MOpM is a contribution from the respective manufacturing operation type MOT to a certain key performance indicator KPI of the product variant PV.

Furthermore, the production efficiency model PEM can include several main types of efficiency drivers which can contribute to the overall efficiency KPI of producing a product variant PV of a product family PF. These efficiency drivers can comprise consumables and wear and tear. Consumables can comprise resources such as electrical energy, fossil fuels and any kinds of materials that are directly consumed during the execution of a manufacturing operation MO. The measurement of consumables can be done with corresponding meter devices for each production machine. For example, energy consumption can usually be measured with minor efforts.

Another efficiency driver, e.g. wear and tear, is associated to maintenance, repair and operation costs of the used machines and tools. Each machine and tool of the complex manufacturing system MSYS can work efficiently in a certain range which is delimited by two boundaries, i.e. an initial state of the machine and tool, and a wear threshold. As soon as the wear threshold is reached, the respective machine or tool has to be maintained in order to reach its initial state again. An example for this can be the wear and tear of a drill head. Each executed manufacturing operation MO that requires a specific drill head can therefore contribute to its wear until the wear threshold is reached and the drill head needs to be replaced. Hence, the effort associated to the replacement of the drill head needs to be distributed according to a percentage of wear caused by different manufacturing operations MO. Both wear and tear as well as consumed resources can be of a discrete or continuous type. Costs for wear and tear per manufacturing operation MO can be modeled in a possible embodiment as a function of machine usage time plus possibly machine operation mode/machine parameter settings. The machine usage time is directly measurable.

A further possible operational efficiency contribution is given by retooling costs, arising from the necessity to reconfigure machines of the manufacturing system MSYS when changing from one product variant PV to another. Whether such efficiency reductions occur, of course depends on the type of production and the type of machines used in the manufacturing system MSYS. There can be further production cost contributions not depending on the execution of production operations MO such as footprint costs and depreciation.

A further main category of production efficiency drivers can be given by production operation durations. The total time for producing a certain product variant PV is a function of these, not necessarily a simple sum because of possible presence of parallel branches as illustrated in FIG. 4.

In contrast to the manufacturing operation model MOpM, the manufacturing model MM includes not only the efficiency functions EF (i.e. the operation specific KPI contributions), but also determines how to aggregate the manufacturing operation type MOT specific efficiency functions EF towards an overall efficiency function, i.e. a key performance indicator KPI for the entire production of one or more product variants PV governed by the same manufacturing model MM. The aggregation prescription is not necessarily a simple sum over the manufacturing operation type MOT specific contributions.

The production process can be considered over an entire uninterrupted production cycle, involving different products or product variants PV. There can be an overarching set of N production operation types MOT covering all different product variants PV. Two products can be produced by the partially or fully same manufacturing operation types MOT, but the common manufacturing operation types MOT can generally differ by their parameterization, i.e. they can have manufacturing operations MO with different values of the process execution data PED.

Any efficiency key performance indicator KPI for a product variant PV can be computed using the production efficiency model PEM, from contributions that can be defined separately for each manufacturing operation MO involved. These contributions in turn can be determined by product features and construction information. The contributions do not depend on the product context so that if a manufacturing operation MO with the same process execution data PED appears in two different product variants PV but using the same machine, its contribution will be the same. In other words, the contribution does not depend on what other manufacturing operations MO are present for manufacturing the product variant PV. This is fundamental for the possibility to re-use information gathered for specific manufacturing operations MO in the context of one or more product variants PV that have actually been produced, for other product variants PV not yet produced (prediction). The operational efficiency contributions (efficiency function values EFV) of a manufacturing operation MO depend on its process execution data PED. The PED in turn are determined by product features and construction information. They often do not depend on the relative order in which the manufacturing operation MO is carried out relative to other manufacturing operations MO. For instance, in the case where the efficiency KPI of interest is total production costs, the total production costs can normally be obtained as a sum over the production costs related to individual manufacturing operations MO occurring in the production process independently of their relative order. A prominent example for this paradigm is the automotive sector where companies use modular construction kits for decreasing the internal complexity be reusing certain modules of a vehicle in different product variants PV. For instance, the assembly costs for an air condition module depend on the type of air condition and not on other features of the vehicle such as the chosen engine (gasoline, diesel, etc.), gearbox (automatic or manual), body type (estate car, hatchback, limousine, etc.), and not on the production status of the intermediate workpiece (vehicle), i.e. the question whether certain other parts (e.g. glove locker) have already been assembled or not. This makes it possible to reuse this cost or KPI term for each product configuration that has the air condition as a feature, leading to a strong increase in usable statistics for the key performance indicator KPI contributions, in particular costs, by this manufacturing operation MO by combining data over many product variants PV of the same product family PF. This assumes that all products produced by the complex manufacturing system MSYS have a substantial degree of similarity in terms of common manufacturing operation types MOT.

For the manufacturing operations MO, it is possible to specify, for the manufacturing operation model MOpM, a set of efficiency functions EF (e.g. polynomial functions in several variables with given degrees, concerning the dependency on continuous process execution data PED). For a relatively large class of production efficiency KPIs, for instance production costs or energy consumption, the general form of the KPI of a product variant PV with $n_1$ occurrences of operation 1, $n_2$ occurrences of operation 2 and ... $n_N$ occurrences of operation N is:

$$\sum_{j_1=1}^{n_1} C_1(\underline{x}_{j_1}^{(1)}) + \sum_{j_2=1}^{n_2} C_2(\underline{x}_{j_2}^{(2)}) + \ldots + \sum_{j_N=1}^{n_N} C_N(\underline{x}_{j_N}^{(N)}) = C_{total} \quad (1)$$

wherein $C_{total}$ is the total value of the efficiency KPI considered for N different manufacturing operation types MOT with occurrence multiplicities $n_1 \ldots n_N$. It is obtained as a sum of the efficiency functions (EF) $C_i$.

For other classes of production efficiency KPIs, Eq(1) has to be replaced by an appropriate formula describing the composition of the total efficiency KPI from the individual contributions (the efficiency functions EF). For concreteness, in this description, the form Eq(1) is assumed, but the proposed method is not restricted to it.

Equation (1) can be written separately for each efficiency key performance indicator KPI, and in the end any weighted linear combination of the efficiency key performance indicators KPIs can be considered by simply performing the corresponding weighted sum over the $C_{total}$ values for each key performance indicator KPI. As an example, one can consider the two types of key performance indicators KPIs "production cost related to material consumption" and "production cost related to wear and tear". In this case, one can simply add up the two elementary key performance indicators KPIs to obtain the total production cost as $$C_{total}^{(material+wear\ and\ tear\ cost)}(\{\underline{v}^{(i)(material)}, \underline{v}^{(i)(wear\ and\ tear)}\}_{i=1\ldots N}) = \qquad (2)$$
$$C_{total}^{(material\ cost)}(\{\underline{v}^{(i)(material)}\}_{i=1\ldots N}) +$$
$$C_{total}^{(wear\ and\ tear\ cost)}(\{\underline{v}^{(i)(wear\ and\ tear)}\}_{i=1\ldots N})$$

each associated with different production execution variables $\underline{v}^{(i)(material)}$ and $\underline{v}^{(i)(wear\ and\ tear)}$, respectively.

All efficiency functions EF for a certain manufacturing operation type MOT (related to different KPIs) should be independent from one another, so that none of them can be computed as a function of the others. For each independent efficiency function EF, there is a separate set of (manufacturing operation type MOT specific) parameters that need to be determined so that the number of necessary measurements increases with the number of independent efficiency functions EF. Often, linear combinations of KPIs are considered, and by consequence, linear combinations of efficiency functions EF for the case where the KPI is given as a sum of the corresponding efficiency functions EF. For instance, a total efficiency KPI could be defined as a sum of 50% cost KPI and 50% "greenness" KPI, and the manufacturing operation type MOT specific efficiency function EF would then decompose in the same way. In the case where only one specific linear combination is ever needed, however, there is effectively only a single efficiency function EF and a single key performance indicator KPI. By contrast, if arbitrary linear combinations of efficiency functions EF and key performance indicators KPI shall be evaluated, one needs to fit the parameters for each of the efficiency functions EF.

Equation (1) is the formula that can be used for predicting product variants PV that have not yet been produced, once the underlying functions $C_i(\underline{v}_{j_i}^{(i)})$ have been fully determined, i.e. their unknown coefficients (for the dependency on the continuous PED variables) and the mapping tables (for the dependency on the discrete PED variables) fixed.

The variables $\underline{v}_{j_i}^{(i)}$ can be derived from the product's feature vectors relevant for manufacturing operation type MOT i. More precisely, the process execution data PED of each BoP manufacturing operation MO can be a function of the product specification. One can establish in a possible embodiment a map from the product specification to the PED variables of all BoP operations, thus reducing substantially the number of independent PED variables. Such a reduced number of variables can comprise a feature vector.

The choice of the functional form of an efficiency function EF, i.e. the efficiency function EF type, e.g. a polynomial or exponential function, can comprise a task which may be performed up front and only once for a production engineer. The choice of a function type can be based on experience and the analysis of the physics of the respective manufacturing operation type MOT. It is possible to test several efficiency function EF types and compare the quality of the results obtained with them, e.g. using regression techniques. For each occurrence of a manufacturing operation type MOT i, numbered by $j_i \in \{1 \ldots n_i\}$, the product feature vector and therefore the resulting value $\underline{v}_{j_i}^{(i)}$ can be different.

In a possible embodiment, a transformed efficiency function EF can be used, for which the dependency on the free parameters to be determined by regression becomes linear. In this embodiment, it is possible to apply techniques of linear regression. For example, suppose the product feature relevant for the manufacturing operation type MOT is characterized by two variables $x_1$ and $x_2$ and the dependency of the efficiency function EF is known to be approximately exponential both in the product feature variables and some of the efficiency function EF parameters to be determined, of the form $W(x_1, x_2) = ae^{bx_1 + cx_2}$. The parameters a, b and c represent the efficiency function EF parameters to be determined e.g. by regression. Then, one can apply the logarithmic mapping:

$$W \to \ln W(x_1, x_2) = \ln a + bx_1 + cx_2 \qquad (3)$$

so that the logarithmized efficiency function EF depends linearly on the parameters ln a, b and c. Working with ln $W(x_1, x_2)$ one can now fit the parameters ln a, b and c using the techniques of linear regression, and in the end revert to $W(x_1, x_2)$. In practice, often efficiency functions EF can be represented by polynomials in the production execution (PED) variables $v^{(i)}$ within the range of interest. In this case, the dependency of all efficiency function EF parameters (i.e. the coefficients of the polynomials) is automatically linear.

In many cases it can be assumed that one has a presentation $C_i(\underline{v}^{(i)})$ for each manufacturing operation type MOT i such that the dependency on the efficiency function EF parameters (sic!) is linear (not necessarily the dependency on the PED variables $\underline{v}^{(i)}$). Then, a regression technique for the so-called general linear problem can be applied. Using regression or other automated learning techniques, the determination of the function parameters can be automated. The goal is to fit the unknown model parameters against measured efficiency function data so that one can, after a limited number of measurements with certain specific features and/or PED values, interpolate the efficiency function values EFV and the resulting efficiency key performance indicators KPI data for all other feature/KPI parameter values that may appear in the future. For measuring actual KPI data, one can set up suitable measurement devices such as counters for consumable measurements and/or inspection tools for the current wear and tear status. These measurement devices need not be present always, but can be set up to perform the required measurements. The present method can limit the number of necessary measurements to a minimum. In this way, with a limited set of efficiency function EF parameters determined by automated learning, it is possible to treat a continuously infinite number of different process execution data PED values of the manufacturing operation MO in question. Data for many different products sharing a certain manufacturing operation type MOT can be combined as in equations (1), (2).

The production execution variable $\underline{v}$ for a given manufacturing operation MO and a given product variant PV may fluctuate statistically during one production cycle. A production cycle can be typically be a work shift or a certain stack of production orders that are produced together by the manufacturing system MSYS. The present method assumes that the production variables $\underline{v}$ for a given manufacturing operation MO only vary by statistical fluctuation during a given production cycle. This means that at least to good approximation, there is no significant systematic trend within one production cycle. Equation (1) describes the predicted total efficiency KPI value for all manufacturing operations MO of a given product variant PV within a certain time span, assumed to be within one production cycle. However, for the learning procedure (e.g. regression) used to determine the coefficients of the production efficiency model, one can consider the statistics for each manufacturing operation type MOT separately, since by the general assumption there is no coupling between the different efficiency function values, in particular costs, for different manufacturing operation types MOT. This means that one can consider each $C_i$ separately.

As a specific example, one can consider the case where $C_i$ corresponds to wear and tear costs $C_i^{(wear\ and\ tear\ cost)}$. To simplify the notation, $\underline{v}^{(i)(wear\ and\ tear\ cost)}$ can be replaced by $\underline{x}^{(i)}$, wherein $\underline{x}^{(i)}$ is a vector of $k_i$ variables $(x_1^{(i)} \ldots x_{k_i}^{(i)})$ and $C_i^{(wear\ and\ tear\ cost)}$ is a function of $(x_1^{(i)} \ldots x_{k_i}^{(i)}$ with $m_i$ unknown parameters $\underline{p}^{(i)} \equiv (p_1^{(i)}, \ldots p_{m_i}^{(i)})$.

An example with m=6 and k=2:

$$C^{(wear\ and\ tear\ cost)}(x_1, x_2) = \quad (4)$$
$$p_{00} + p_{10}x_1 + p_{01}x_2 + p_{11}x_1x_2 + p_{20}x_1^2 + p_{02}x_2^2$$

wherein index i has been dropped for simplicity.

The amount of measurements required for the coefficient determination to work depends on the amount of different operation types MOT N and the number $m_i$ of unknown model parameters of the efficiency functions EF. For each function $C_i$, there should be at least $m_i$ measurements with different production parameter values $\underline{v}_{j_i}^{(i)}$ ($j_i$=1 ... $m_i$). A minimum set of measurements only allows to make a simple fitting of the model parameters p. In general, the model parameter values thus obtained depend on the set of measurements chosen and may be not fully reliable. It may be better to invest somewhat more measurements and to extend the procedure, for example by standard regression analysis, where there are more measurements than absolutely required and where one looks for the best fit of model parameters p against measured KPI values (e.g. least mean square). The quality of the coefficient determination can be increased with the number of measurements. The available statistics can be greatly enhanced by the combination of measurements for different products involving the same manufacturing operation type MOT, possibly with different process execution data PED values. The number of measurements available for different production operation types MOT of a given product variant PV can differ and therefore also the accuracy of the estimate obtained by the learning (e.g. regression) procedure. The total estimation accuracy for an entire product variant PV can be obtained using standard statistical techniques. However, if for a certain manufacturing operation type MOT, the number of measurements in one production cycle is insufficient (less than $m_i$), it is impossible to fix the efficiency function EF parameters for this manufacturing operation type MOT. If there are good a priori arguments that the time variance of the KPI for that manufacturing operation type MOT should be small, it is possible to combine measurement data from successive production cycles until at least the minimum required number of measurements has been reached. In a possible embodiment, one can also try to simplify the functional form of the efficiency function EF so that less parameters to be determined (fitted) are involved. The quality of the fit with a simplified function, in the case of applying regression, can always be tested with the well-known regression coefficient $R^2$. The regression coefficient can also be used to check whether it is justified to combine data from different production cycles. It is possible to combine data from enough production cycles to be able to determine the efficiency function EF parameters, and then check if $R^2$ deteriorates when adding further production cycles. If the regression coefficient $R^2$ does not deteriorate or even improves, this is a justification for combining production cycles.

If the relative contribution to the KPI of the manufacturing operation type MOT to the products of interest is known to be small, one may also decide to simply accept the indeterminacy of the KPI contribution of the operation or work with a rough a priori estimate of the efficiency function EF parameters.

For manufacturing operation types MOT with discrete PED, regression techniques are not applicable, since it does not make sense to interpolate between the different discrete values of the respective PED. Instead, it is possible to set up a mapping in table form that specifies the value of the efficiency function EF of the manufacturing operation model MOpM for each combination of the discrete PED. The efficiency values of these tables may be known up front or measured. Still, using the general assumption of the independence of the efficiency values of a certain manufacturing operation MO of the context of the other MO, it is possible to reuse measurements made within the context of one product for many other products and thus significantly reduce the number of table entries that have to be determined in order to characterize the efficiency for the whole set of product variants PV. Once the efficiency function EF parameters and mapping tables have been determined, the resulting production efficiency model PEM can make predictions of key performance indicators $\widetilde{KPI}$ of product variants PV that have not yet been produced at all.

The degree of importance of statistical analysis differs between manual operations and automated operations. For automated operations, the degree of reproducibility is typically very high and thus the statistical fluctuations can often be essentially neglected. However, in the present setting of a high variable low volume production, there can still be the challenge that every automated production operation type MOT has to be performed at least once before a statement on its viability and performance impact can be made. As a consequence, the number of product variants PV produced without valid a priori efficiency information data can become too large, inflicting an unacceptable production risk for the manufacturer. Therefore, the fitting procedure described above can still be very valuable.

Automated manufacturing operations MO are directed by suitable computer programs, e.g. CNC programs for machining operations performed by machines of the complex manufacturing system MSYS. These computer programs can be provided for all product variants PV of the product family PF to be produced by the complex manufacturing system MSYS. The time to perform a manufacturing operation MO can be directly determined by the kinematics coded in the respective computer programs, and can therefore be read off the programs automatically without actually executing the respective computer programs. However, returning to the important examples of wear and tear and energy consumption, neither wear and tear nor energy consumption form a function of movement time alone. A model needs to be set up initially that can determine, for the class of machines of interest for the automated manufacturing operation type MOT considered, the wear and tear as well as energy consumption as a function of relevant machine operation parameters (the subset of the process execution data PED relating to the machine), typically parameters like machine operation mode, tool used, material worked upon, and finally machine usage time. These models can be set up by a production engineer. The efficiency function EF generally does not yield the same result for all machines that can be used for the manufacturing operation type MOT in question, and therefore parameter fitting analysis is performed in a preferred embodiment separately for different machines.

For manual manufacturing operation types MOT, labor time is often the dominant factor for determining efficiency. Labor time may be strongly fluctuating in non-clocked manufacturing operations MO, as a function of the worker's current physical fitness and experience as well as environmental conditions. Other consumables such as energy may also be influenced by fluctuations in labor time, and they are typically influenced by fluctuations in work quality. Even in clocked manufacturing operations MO, labor time may come in again through rework operations in case of failed quality checks. Therefore, for manual operations, statistical analysis is almost always beneficial. Labor time can be measured by registering the time when a workpiece arrives or leaves the manual workplace. This process can be often already in place for product genealogy purposes, and then can be used without extra effort for time measurements.

It is necessary to address the fact that a manufacturing operation MO does not always terminate with complete success. There is a certain risk of insufficient quality, resulting in the necessity to rework of the production process. Further, machines of the complex manufacturing system MSYS can break down unexpectedly, leading at least to longer execution times for production operations MO carried out by the machines. The complete loss of a workpiece leads to deterioration of efficiency and performance that depend not only on the manufacturing operation MO that failed, but at least on all other preceding manufacturing operations MO. In such scenarios, it is no longer possible to consider all manufacturing operations MO as independent. Machine breakdown of a manufacturing machine may lead to ripple effects for ensuing manufacturing steps, and may be afflicted by similar problems. Since these types of effects cannot be treated on a level of individual manufacturing operations MO, a different approach can be chosen. The Bill of Process BoP can be completed by rework branches for every product or product variant PV. These rework branches are associated with empirically determined probabilities. Efficiency functions EF required for rework operations can also be measured, but this is not always necessary since rework operations are normally relatively rare and potential errors in their efficiency estimates can be considered as a secondary effect for the total production efficiency estimate of a final product. Instead, rough manually determined estimates are typically sufficient. The probability for a rework branch to be started depends on the probability of a certain manufacturing operation MO to produce insufficient results. The combination technique can therefore also be applied to gather statistics on these probabilities.

The production of scrap can be similarly associated with empirically determined probabilities, associated with the failure of individual manufacturing operations MO. Machine breakdown is somewhat more difficult to treat if one wants to take into account ripple effects resulting from delaying production of the present and other products as well. This does, however, depend on the dynamic production mix and machine load during a specific production period. Therefore, such effects cannot be easily associated with a single product as a whole as opposed to a single manufacturing operation MO. Accordingly, in the current context of the present invention, effects resulting from a machine breakdown can only be considered as a contribution to scrap and rework. This means, assuming that with a certain probability, a manufacturing operation MO results in scrap because of a machine breakdown (contribution to total probability for operation to result in scrap), and also with a certain probability, a manufacturing operation MO has a result causing the necessity of rework as a consequence of a machine breakdown (contribution to total probability for operation to result in necessity of rework).

In the following, the particular embodiment for the parameter learning procedure given by regression analysis will be laid out in detail. A least squares operation procedure is applied for a single production cycle. By using the least squares method, it is intended to minimize the difference between obtained measurement results $y_j=y(\underline{x}_j)$, where $y(\underline{x}_j)$ is a simpler notation for $C_i(\underline{v}_{l_j}^{(i)})$ with any fixed i, $\underline{x}_j$ taking the role of $v_{l_j}^{(i)}$. A model function depending linearly on the parameters $\underline{p}$ is assumed and shall be determined by minimizing the distance norm:

$$D_q = |\underline{y} - \underline{A}\underline{p}|^2 \quad \text{(Dq)}$$

$$A_{js} = \varphi_s(\underline{x}_j) \quad \text{(Adef)}$$

(quadratic distance norm). The matrix is given in terms of basis functions $\varphi_s$ (s=1 ... m) used to match experimentally measured efficiency function values EFV against a model. Note that the basis functions $\varphi_s(\underline{x}_j)$ are not necessarily linear functions of the $\underline{x}_j$. It is only assumed that there exists a linear combination (given by the parameters $p_i$) of these basis functions that describes with good accuracy the true efficiency function EF for all values of $\underline{x}$. This corresponds to assuming the validity of the so-called general linear model. The values $x_j$ correspond to the different measurements, j=1 ... n. The least squares method is known to have a few desirable properties, such as maximizing the well-known goodness of fit parameter $R^2$ and ensuring that the proposal for $\underline{p}$ obtained has the right expectation value with respect to statistical fluctuation in $\underline{y}$.

The solution of the above minimization problem is given by:

$$\underline{A}^T \underline{A} \underline{p} = \underline{A}^T \underline{y} \text{ or}$$

$$\underline{p}_{LS} = (\underline{A}^T \underline{A})^{-1} \underline{A}^T \underline{y} \quad \text{(LinP)}$$

where $y_l = y(x_{1l}, x_{2l}, \ldots x_{kl}) = y(\underline{x}_l)$ wherein $l = 1 \ldots n$ the measurement number, and $y_l$ is the measured efficiency value vector for production variable components $x_1, x_2, \ldots x_k$. The reason for not writing $\underline{p} = \underline{A}^{-1}\underline{y}$ is that $\underline{A}$ is generally non-invertible (not even quadratic), while $\underline{A}^T \cdot \underline{A}$ is manifestly positive semidefinite. If $n \geq m$ and $\underline{A}$ has a maximum rank, it is positive definite and therefore invertible, so that the solution of the minimization problem is unique and given by the above definition. $\underline{A}^T$ is the transposed matrix, $A_{sj}{}^T = A_{js}$. The solution of the above minimization problem minimizes the deviations coming potentially from two different sources:

The production efficiency model PEM may not be fully correct, that is, even in the absence of random fluctuations, the basis functions do not suffice to describe the measurement values for all values of $\underline{x}$ and therefore possibly not for all values $\underline{x}_j$ that occurred within the measurements.

Further, there can be random fluctuations of the measurement values $y_l$ around what would have been expected in the absence of random fluctuations. These fluctuations may be inherent in the measured quantity (thus occurring even for infinite measurement precision) and/or may be a consequence of measurement inaccuracies.

The first source for deviations may be reduced or even removed by increasing the complexity of the so-called general linear model, i.e. the number m of independent basis functions $\varphi_s$. But as m grows large, the condition $n \geq m$ may cease to be valid (leading to an underdetermined problem), so there may be no longer a unique solution of the above given minimization problem. One may also optimize, for a fixed m, the set of basis functions $\varphi_s$ used. But the optimization has to be made with respect to a specific set of measurement values $y_l$ and input values $\underline{x}_l$, and may depend on it (overfitting), because one does not know the true efficiency function EF and can only sample it by specific measurements. Here, the choice of the $\varphi_s$ is taken to be an input of the procedure and determined by a priori considerations, e.g. considering the physics of the production operation type MOT in question. If a general linear model with a small number of basis functions is applicable so that the systematic modeling error can be neglected, the solutions $\underline{p}_{LS}$ of the least square minimization problem can be understood as an estimator for the true parameter values.

One can introduce hatted quantities $\hat{\underline{p}}_{LS}, \hat{\underline{y}}$ to denote random variables of which $\underline{p}_{LS}$ and $\underline{y}$ denote particular realizations. According to the linear minimization problem, $\hat{\underline{p}}_{LS}$ is a linear functional of $\hat{\underline{y}}$, wherein $\hat{\underline{y}}$ can be written as:

$$\hat{\underline{y}} = \overline{\underline{y}} + \hat{\underline{\epsilon}} \quad \text{(yStat)}$$

with $\overline{\underline{y}} = \langle \hat{\underline{y}} \rangle$ the expectation value of $\hat{\underline{y}}$ and $\hat{\underline{\epsilon}}$ is a random variable with a mean value zero.

By construction, the expectation value of $\hat{\underline{p}}_{LS}$ fulfills $$\langle \hat{\underline{p}}_{LS} \rangle = (\underline{A}^T \underline{A})^{-1} \underline{A}^T \overline{\underline{y}} \quad \text{(LinPE)}$$

considering all fluctuations of $\hat{\underline{y}}$ and regarding the $\underline{x}_l$ as given and fixed. If the linear model is correct, in the absence of random fluctuations $\underline{y} = \underline{A} \cdot \underline{p}$ must by definition hold for suitable $\underline{p}$, which then is immediately seen to have to agree with $\underline{p}_{LS}$.

There is actually one set of $\varphi_s^{(i)}(\underline{x}^{(i)})$ ($s = 1 \ldots m_i$) for every manufacturing operation type MOT i and also the number n of measurements available may depend on i. However, since the operation i considered is fixed, and the treatment is exactly the same for every i, the index i can be dropped. Thus, one has for the model function determined by the regression $$y_{reg}(\underline{x}) = \sum_{s=1}^{m} (p_{LS})_s \varphi_s(\underline{x}) \quad \text{(Regres)}$$

with $p_s$ as given by the linear minimization problem, one has:

$$(\underline{A}^T \underline{A})_{st} = \sum_{j=1}^{n} A_{js} A_{jt} = \sum_{j=1}^{n} \varphi_s(\underline{x}_j) \varphi_t(\underline{x}_j) \text{ and} \quad \text{(ATA)}$$

$$(\underline{A}^T \underline{y})_s = \sum_{j=1}^{n} A_{js} y_j = \sum_{j=1}^{n} \varphi_s(\underline{x}_j) y(\underline{x}_j) \quad \text{(ATy)}$$

so that $$(p_{LS})_s = \sum_{t=1}^{m} \left( \sum_{j=1}^{n} \varphi_{s'}(\underline{x}_j) \varphi_{t'}(\underline{x}_j) \right)_{st}^{-1} \sum_{j'=1}^{n} \varphi_t(\underline{x}_{j'}) y(\underline{x}_{j'}) \quad \text{(ALs)}$$

This minimizes the equally weighted quadratic deviation between measured and modeled cost function:

$$D_q = \sum_{j=1}^{n} \left( y(\underline{x}_j) - \sum_{s=1}^{m} p_s \varphi_s(\underline{x}_j) \right)^2 \quad \text{(Dq)}$$

The procedure for automatically learning the model parameters has been described so far under the assumption that all efficiency functions EF of manufacturing operation models MOpMs are time-independent within a considered time window (here one production cycle). For longer time windows, this is not always the case. For instance, energy costs per energy unit or material costs per unit of material may change over time as market prices change. The latter effect is harmless because energy and materials costs may first be determined in terms of consumed energy and material units, and then a current market price per unit can be applied at the time of cost estimation. There may, however, also be some more subtle changes. For instance, production machinery can age and this may manifest itself in higher energy consumption, higher failure rates, lower quality with increased necessity of rework. Further, also environmental conditions such as temperature, air pressure, etc. may vary over time and can have an impact on the production efficiency. There is thus a certain conflict between the necessity to gather large enough statistics for reliable model parameter estimates, and the fact that the longer one collects data, the higher the risk that newer data actually describe a different manufacturing operation model MOpM than older data and therefore should not be mixed. This is also known as the trending problem. If the model parameters p do not change significantly within one production cycle but there is still enough data in each production cycle to fit the model parameters p, the trending problem does not have to be treated. Rather, one can simply repeat the regression procedure for each production cycle. Instead, for instance, if the amount of data per production cycle is not always sufficient, one may choose to apply a trending analysis, for instance assuming a linear recursion relation for the true values of the parameters in the production cycle number c, in the form $$\underline{p}(c+1) - \underline{p}(c) = \underline{a} + \underline{P}\,\underline{p}(c) \qquad \text{(pc)}$$

wherein $\underline{a}$ is a c-independent vector and $\underline{P}$ is a c-independent matrix. Again, a least squares method can be applied to determine the parameters $\underline{a}$ and $\underline{P}$ and the initial condition $\underline{p}(1)$. There is an initial condition $\underline{p}(1)$ that needs to be specified for producing a unique solution. Therefore, instead of the parameter set $\underline{p}$ of the time-independent case, one now has the parameters $\underline{p}(1)$, $\underline{a}$ and $\underline{P}$ to be determined (a total of $2m+m^2$), obviously a lot more than in the static case, where there are just m. Sometimes, there are priori arguments that the number of model parameters can be reduced (e.g. only the first term present on the right hand side). In the following, it is described how to apply regression using the least squares method to the above time variant problem. According to (pc), one needs to determine $\underline{p}(1)$, $\underline{a}$ and $\underline{P}$.

One can minimize (Dq) generalized to c cycles:

$$D_q^{(c)} := \sum_{c'=1}^{c} |\underline{y}(c') - \underline{A}(c')\underline{p}(c')|^2 \qquad \text{(Dqc)}$$

where $\underline{y}(c)$ contains only measurement results from production cycle c and $\underline{p}(c)$ is given by (pc). The relation (pc) can be easily solved to give:

$$\underline{p}(c) = \sum_{c'=0}^{c-2} \underline{\tilde{P}}^{c'}\,\underline{a} + \underline{\tilde{P}}^{c-1}\underline{p}(1)\ (c \ge 2) \qquad \text{(pcsol)}$$

The equation (pcsol) can be used also for c=1 if one sets $\underline{\tilde{P}}^0 := \underline{1}$ and $\Sigma_{c=0}^{-1}\underline{\tilde{P}}^{c'}\underline{a} := 0$.

with $\underline{\tilde{P}} := \underline{1} + \underline{P}$ and the free initial condition $\underline{p}(1)$.

Then, one can get the minimization conditions:

$$0 = \sum_{c'=1}^{c} \frac{\partial D_q^{(c)}}{\partial p_{s'}(c')} \frac{\partial p_{s'}(c')}{\partial p_s(1)} \quad (s = 1\ \ldots\ m) \qquad \text{(M1)}$$

$$0 = \sum_{c'=1}^{c} \frac{\partial D_q^{(c)}}{\partial p_{s'}(c')} \frac{\partial p_{s'}(c')}{\partial \tilde{P}_{st}} \quad (s, t = 1\ \ldots\ m) \qquad \text{(M2)}$$

$$0 = \sum_{c'=1}^{c} \frac{\partial D_q^{(c)}}{\partial p_{s'}(c')} \frac{\partial p_{s'}(c')}{\partial a_s} \quad (s = 1\ \ldots\ m) \qquad \text{(M3)}$$

A lengthy manipulation of the above equations leads to the results:

$$0 = \sum_{c'=1}^{c} \frac{\partial D_q^{(c)}}{\partial p_{s'}(c')} (\underline{\tilde{P}}^{c'-1})_{s's}\ (s = 1\ \ldots\ m) \qquad \text{(SumEq)}$$

$$0 = \sum_{c'=1}^{c} \frac{\partial D_q^{(c)}}{\partial p_s(c')}\ (s = 1\ \ldots\ m)$$

$$0 = \sum_{c'=1}^{c} \frac{\partial D_q^{(c)}}{\partial p_s(c')} \left\{(\underline{\tilde{P}}^{c'-1})_{tt}, (p_{t'}(1) - p_{t'}(2))\right\}\ (s, t = 1\ \ldots\ m)$$

-continued with $$\frac{\partial D_q^{(c)}}{\partial p_s(c)} = 2A_{\bar{s}s'}(A_{\bar{s}\bar{s}}(c')p_{\bar{s}}(c') - y_{\bar{s}}(c'))$$

As before, a summation over repeated indices can be implied and the notation $(\underline{\tilde{P}}^{c'-1})$ can be used for the matrix elements of the c'-1th power of the matrix $\underline{\tilde{P}}$.

There are $m^2+2m$ variables $\tilde{P}_{s_1 s_0}$, $p_t(1)$ and $a_t$ to be determined, from the same number of equations. Since the equations are nonlinear in $\underline{\tilde{P}}$, $\underline{a}$ and $\underline{p}(1)$, this generally has to be carried out numerically. However, for small enough production cycle number c, a different approach can be taken.

Not only the unweighted sum $$\sum_{c'=1}^{c} \frac{\partial D_q^{(c)}}{\partial p_s(c')}$$

in the second equation (SumEq) must vanish, but also a set of m weighted sums (corresponding to the possible values of t), with the weights given by the second factor in the last of the three equations (SumEq). For c vectors $$\frac{\partial D_q^{(c)}}{\partial p_s(c')}$$

of dimension m, there are thus in total m+1 equations, from the second and third equation (SumEq). If all these equations are independent in the sense that none is given by a linear combination of the others, then the vanishing of all vectors is implied for m+1≥c. The vanishing of the $$\frac{\partial D_q^{(c)}}{\partial p_s(c')}$$

for all c'≤c and s=1 ... m means that one is led back to the time-independent case, where minimization of $D_q^{(c)}$ is considered separately for every production cycle. On the other hand, it is necessary to also fulfill the recursion relations (pc) one has $m^2+2m$ free parameters in the recursion relations, contained in $\underline{P}$, $\underline{a}$ and $\underline{p}(1)$, and if the $\underline{p}(c'')(1\le c''\le c)$ are all uniquely determined by the time-independent conditions, then one has to satisfy mc conditions with $m^2+2m$ variables. For c≤m+2, with m≥1, in particular for c=1, 2, 3, this is possible, and so for c≤m+2, one can reduce the problem to first solving the conditions for the time-independent case cycle by cycle, and then imposing the recursion conditions, which may even remain undetermined. The condition c≤m+2 includes m+1≥c, so one knows that whenever required, it is possible to fit the free parameters $\underline{P}$, $\underline{a}$ of the recursion relations. However, in this case, there is actually little benefit obtained from imposing the time development model (pc). It is clear that the solutions obtained under the assumption of invertible $\underline{P}$ do in fact represent the absolute minimum of $D_q^{(c)}$, because every term is separately minimized.

For c≥m+3, on the other hand, it is generally not possible to first solve the time-independent conditions and then to determine the parameters of (pc), because there will be no solution for the parameters of the recursion relations. But also in the second and third equation of (SumEq), there are now not enough equations to enforce the vanishing of $$\frac{\partial D_q^{(c)}}{\partial p_s(c')},$$

even if they are all independent. One is led to more general solutions.

The above considerations provide a concrete feasible way to carry out an optimum adaption of the model parameters to the measured data even in a situation where the manufacturing operation model MOpM parameters p change over time (i.e. as a function of the production cycle c). There are, of course, many other possible ways, for instance, using neural networks.

The quality of the adaption of the manufacturing operation model MOpM parameters to the data can be validated. Within the realm of regression techniques, it is common to use the coefficient of determination $$R^2 = 1 - \frac{\sum_{j=1}^{N}(\hat{y}_j^{reg} - y_j)^2}{\sum_{j=1}^{N}(y_j - \bar{y})^2}; \bar{y} = \frac{1}{N}\sum_{j=1}^{N} y_j \quad (R2)$$

to do this. Here, $\hat{y}_j^{reg}$ are the predictions for the values obtained by fitting the manufacturing operation model MOpM parameters, and here by regression as outlined above, and $y_j$ are the measured efficiency function values EFV. The sum over j a priori includes all measurements from all production cycles, but could also be restricted to certain production cycles, e.g. the most recent ones. $R^2$ values close to 1 signal a good fit. A fit that was good initially, i.e. for some number of production cycles, does not need to continue to remain a good fit. It may happen that the manufacturing operation model MOpM and the whole production efficiency model PEM, defined by its time dependency (here for concreteness taken to be given by (pc)) and by its basis functions $\underline{\varphi}(\underline{x}_j)$, ceases to be valid, for instance because operational or environmental conditions change so drastically that this cannot be mapped to a change in the model parameters of the same model. $R^2$ together with a suitable threshold value can usually be a good indicator for when a review of the entire model structure may be needed. Not for every manufacturing operation type MOT, however, it is really necessary to have a very precise fit. Some operation efficiency function values EFV may be small compared to others, for the product variants PV considered, and then even a very rough fit may be good enough.

The following cases may generally occur: namely a high certainty with low efficiency, a high certainty with high efficiency, a low certainty with low efficiency and a low certainty with high efficiency, wherein by "certainty" the value of the $R^2$ coefficient is meant Only the case with low certainty and low efficiency is of real interest for considering replacing the model. For different operations, the situation may be quite different and one can replace the models for the operations that cannot be fitted reasonably any more. Thus, one is led to the following overall adaption process as illustrated in the schematic diagram of FIG. 5.

FIG. 5 illustrates a recursive manufacturing operation model MOpM adaption process with an iteration loop. In a first step S51, one (manually) defines the structural form of the efficiency functions EF (i.e. the efficiency functions EF with parameters still undetermined, such as for example a quadratic function with 3 undetermined parameters) for the manufacturing operation models MOpM for all BoP operations (this can be supported e.g. using case-based reasoning). The product lifecycle management PLM system of the complex manufacturing system MSYS provides the process context data PCD and (planned) process execution data $PED_p$ to the manufacturing execution system MES of the complex manufacturing system MSYS. MES relays said data to the processing unit PU executing step S52, as illustrated in FIG. 5. The process execution data PED may also be measured with suitable measurement devices present on the manufacturing shop floor MSF, to form measured process execution data $PED_m$, thus refining or replacing the $PED_p$ data from the PLM.

In a step S52, during the production of one or several product variants PV the efficiency function values EFV transmitted by the manufacturing execution system MES are fed into the relevant manufacturing operation models MOpM, in order to drive the adaptation of the model parameters.

In a further step S53 of the iteration loop, the parameters p of the manufacturing operation model MOpM are learned, e.g. by regression or by using a neural network NN, for instance a recurrent neural network RNN.

In a further step S54, the reliability of the learned manufacturing operation models MOpM can be assessed.

In a further step S55, the model parameters p of the manufacturing operation models MOpM can be updated to provide different updated manufacturing operation models MOpM for different times (trending problem).

The process of defining a suitable a manufacturing operation model MOpM structure, namely the choice of the efficiency function EF structures or manufacturing operation model MOpM structure alternatives in case of deteriorating fits can be supported by a case-based reasoning. Classic case-based reasoning helps to identify comparable manufacturing operation types MOT in historical data. Possible variables to define a distance function between historic and new cases comprise process execution data PED, operation description (such as machine name, size, tool, manufacturer, . . . ), operation category (such as manual or automated, assembly, milling, bending/pressing, welding, foundry, paper, chemistry) and functional dependency on the process execution data PED (linear, quadratic, cubic, . . . ).

The degree of universality of a manufacturing operation model MOpM may cause problems in practice. This refers to the issue that it may not always be evident whether one can use the same model structure (with different parameter values) for two different but similar manufacturing operation types MOT. For instance, there may be different types of drilling and it may not be obvious that the manufacturing operation model MOpM used for one type of drilling is applicable to the other type of drilling. It is desirable to avoid a proliferation of models, in particular manufacturing operation models MOpM, because each model still has to be designed up front, and only the following parameter adaption comprises an automatic process. Generic models like neural networks may fare better here, because they do not necessarily require a new configuration for every manufacturing operation type MOT and may be able to judge for themselves how similar two manufacturing operation types MOT can be considered to be depending on the attributes describing the manufacturing operation types MOT. Still, also for regression-based approaches, it is possible to define an efficient procedure. One can start from a minimum number of model structures that still appears reasonable (assuming a high degree of universality of the manufacturing operation models MOpM), and then can check $R^2$ as soon as a sufficient amount of data becomes available. For unsatisfactory $R^2$, one can check for which of the subtypes of the manufacturing operation type MOT that may need to be distinguished (there is usually some good intuition on what they are, based on the characterization of the operations in the PLM tool), the value is bad and for which it is satisfactory. Then, one can replace the manufacturing operation model MOpM specifically only for those with bad $R^2$.

Further, extrinsic factors may also cause problems in practice. The manufacturing operation model MOpM chosen may not always contain all the parameters p of importance. For instance, it may turn out that for some production operation MO, the efficiency function value EFV strongly depends on temperature (because the operation may take much longer for certain temperatures). Then, the obtained fit may be very poor. This is true independently of the fitting method chosen, in particular also true if neural networks are used, because also neural networks NN cannot learn what they are not told, so if, in the given example, a temperature measurement is not available, little can be done to improve the fit. If there is a hypothesis on what could be missing as relevant environmental or other parameters, one can start to extend the respective manufacturing operation model MOpM or one can feed these parameters into the neural network NN as well.

The recursive adaption of the production efficiency model PEM may be used not only for predicting the efficiency of production of not yet produced product variants PV. In the context of Industry 4.0, a flexible manufacturing production setting where different possible production methods may be available, one can also use it to support the manufacturing execution system MES in finding an optimum choice among the alternatives, or to optimize specific production parameters for the product variants PV that are currently of main interest. The determination of the best alternative can be used by the manufacturing execution system MES without requiring human intervention. In other words, the present invention can be used for an automatic optimization of the production process.

The main advantage of the computer-implemented method according to the present invention is the provision of an automated end-to-end procedure that allows determination of a production efficiency model PEM from manufacturing shop floor, MSF, data collected by a manufacturing execution system MES and on the basis of production structure data provided by a product lifecycle management (PLM) tool. For Industry 4.0 type production with an enormous amount of possible production variants PDV and product variants PV, it would be hopeless to undertake this effort without using a computer system, providing data integration and evaluation algorithms offered by the present invention. This is true especially in view of the fact that product lifecycles of products accelerate constantly and this effort would have to be repeated in short intervals. Also, the capabilities of the computer-implemented method according to the present invention to perform trending automatically for all parameters of the employed manufacturing operation model MOpM represent a progress over currently available conventional efficiency estimation tools.

A production manager of a complex manufacturing system MSYS can thus obtain a precise, constantly up to date picture of the efficiency structure of the complex manufacturing system MSYS, and is further supported in calculating competitive prices and in identifying unprofitable product variants PV. Basing the used production efficiency model PEM on actual efficiency data, in turn relying on the true production process as provided by the Bill of Process BoP, instead of the common practice of inaccurately representing not very well-known cost structures in terms of overhead costs, contributes strongly to the accuracy of the predictions of the key performance indicators $\widehat{KPI}$ provided by the computer-implemented method according to the present invention. A display of the results in the form of annotated process graphs can strongly enhance transparency of the entire production process compared to conventional process efficiency analysis tools.

Overcoming the problem of false overhead costs is tackled by including production process structure information from the product lifecycle management PLM and the manufacturing execution system MES and by automatically associating them with manufacturing shop floor MSF data provided by the manufacturing shop floor MSF of a complex manufacturing system MSYS. The combination of data from different product variants PV for the same manufacturing operation types MOT creates the necessary statistics for a reliable determination of the model parameters p even in a setting where the production numbers for each individual product variant PV are very low, thus covering also lot size or batch size 1 scenarios.

Direct measurements of operation-specific efficiency values can be supported by suitable measurement devices, such as sensors or power meters for each machine within the manufacturing shop floor MSF of the complex manufacturing system MSYS. This can then be combined with the provision of the necessary context data PCD by the manufacturing execution system MES.

The automated update of manufacturing operation model MOpM and its parameters p can be realized with a trending approach, specifically demonstrated in terms of least squares analysis with a recursive relationship between manufacturing operation model MOpM parameters p at different times, i.e. different production cycles. The computer-implemented method according to the first aspect of the present invention provides an automated process to guide a user to determine applicable manufacturing operation model MOpM and/or applicable production efficiency model PEM structures based on finding similar historical production efficiency models and identifies the necessity to replace a model based on constant surveillance of the coefficient of determination $R^2$ of the model fit currently obtained.

The computer-implemented method according to the present invention can be used also on a cloud platform. The production efficiency model PEM including manufacturing models MM with manufacturing operation models MOpM as illustrated in the UML diagram of FIG. 15 can be deployed to the cloud platform where it can be used to directly access the connected sensor data or measurement data received from one or possibly more manufacturing shop floors MSF and can make use of the computing power and continuous availability provided by the cloud platform. This becomes even more important in production networks, where individual factories or complex manufacturing systems MSYS collaborate in order to produce different product variants PV of a product family PF. The computer-implemented method can also be used to improve the accuracy of current production efficiency estimates and can provide a more detailed and complete overview of the efficiency structure of the product variant PV. The predicted key performance indicators $\widehat{KPI}$ can be used as an input for automatic or manual optimization measures within a complex manufacturing system MSYS as well as for decisions on the product spectrum and product variants PV to be produced by the complex manufacturing system MSYS. The applied manufacturing operation models MOpM can be adapted based on real-time data. The computer-implemented method according to the present invention provides predictions of key performance indicators $\widehat{KPI}$ of not yet produced product variants PV for different production alternatives and can therefore also be used for optimizing a manufacturing process performed by a complex manufacturing system MSYS. Manufacturing operation models MOpM can be adapted automatically so that model parameters p change over time.

In the following, the different main steps S1 to S4 of the computer-implemented method according to the first aspect of the present invention are described in more detail with reference to a specific example.

Figure 6:
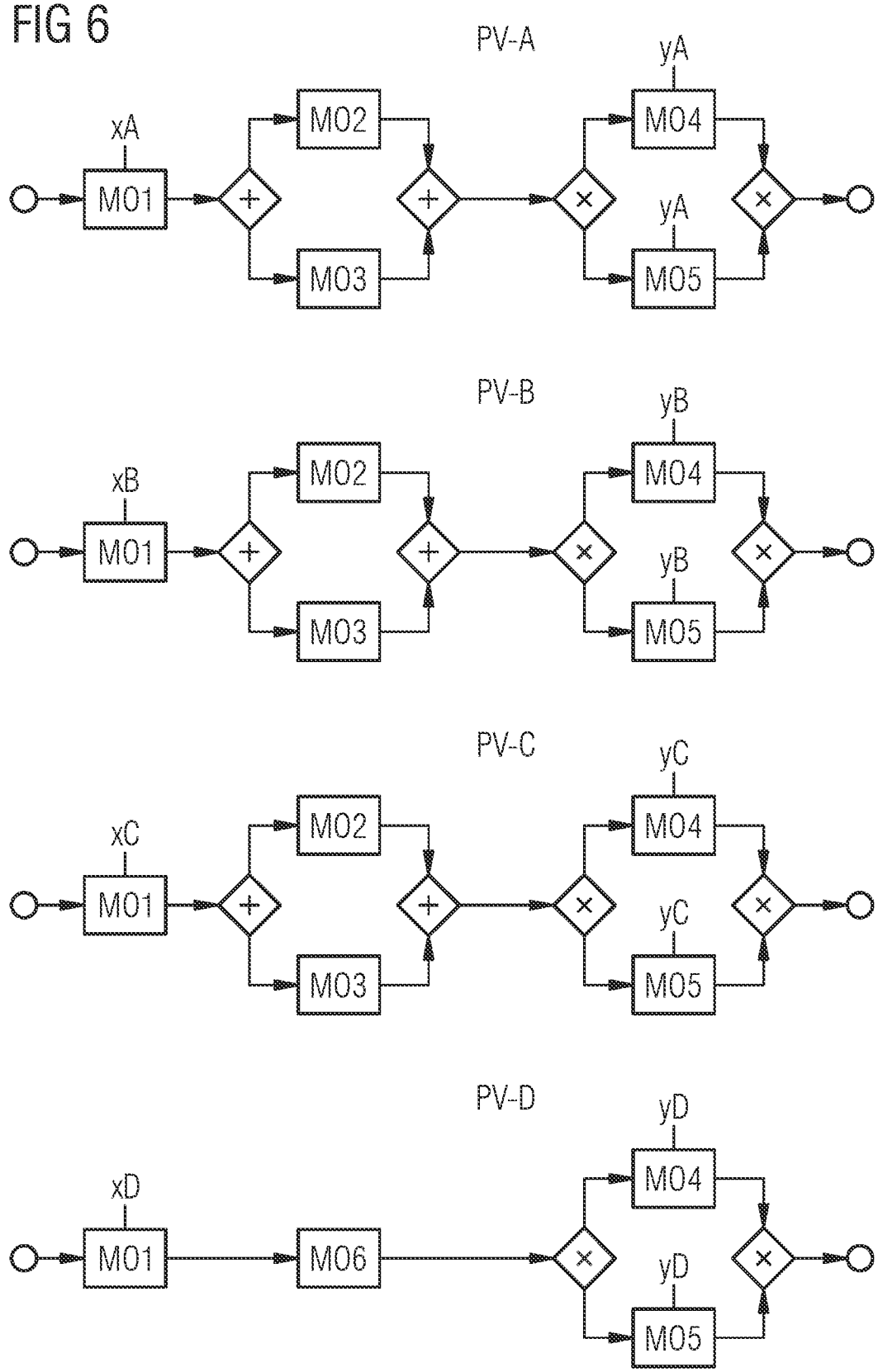
FIG. 6 to 13 illustrate an example for explaining the operation of the method and apparatus according to the present invention.
Figure 14:
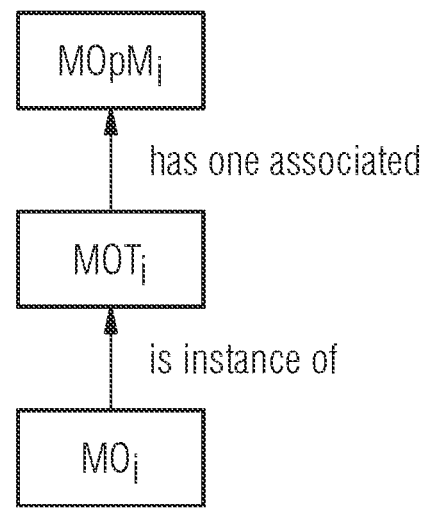
FIGS. 14, 15 show diagrams for illustrating the method and system according to the present invention.

In a first step S1 of the computer-implemented method according to the first aspect of the present invention, a manufacturing operation model MOpM structure is provided for each manufacturing operation type MOT used to manufacture a product variant PV of the product family PF. FIG. 6 shows execution flow diagrams to illustrate different manufacturing operations MO to produce different product variants PV-A, PV-B, PV-C and PV-D. In FIG. 6, there are manufacturing operations MO of different manufacturing operation types MOT, wherein each manufacturing operation type MOT has one associated manufacturing operation model MOpM as also illustrated in FIG. 14. For simplicity of notation, the manufacturing operation names MO1, . . . , MO5 are identically repeated for all production variants PV shown, but it should be understood that only the manufacturing operation types MOT are the same, while the process execution data PED of the manufacturing operations corresponding to these same manufacturing operation types MOT generally are different for different product variants. Each manufacturing operation MO is an instance of a manufacturing operation type MOT (class) as also illustrated in FIG. 14. For the manufacturing operations MO1, MO4, MO5 of the four execution workflows shown in FIG. 6, the associated process execution data (PED) xA, yA, xB, yB, xC, yC, xD, yD have been indicated explicitly, but of course also MO2 and MO3 may have such PED parameters.

In the illustrated example of FIG. 6, the manufacturing operation MO1 is a drilling operation, and this manufacturing operation type shall be called MOT1. The efficiency function EF for the manufacturing operation model MOpM for the drilling operation MOT1 can be for example $E(MOT1) = ax^2 + bx + c$, wherein x is the drilling depth D1 of a driller, and a, b, c are the unknown model parameters Thus, the process execution data PED for this example is x: drilling depth D1, and the efficiency function EF for the key performance indicator KPI is given by the energy consumption of the drilling operation.

In the illustrated example, the manufacturing operation MO4 comprises a three-axis milling process. The efficiency function EF for the manufacturing operation model MOpM for the corresponding manufacturing operation type MOT4 can be as follows:

$$E(MOT4) = d*\ln(y+1+ey+f)$$

(y = milling depth D2, and d, e, f = model parameters)

The manufacturing operation model MOpM for the manufacturing operation type MOT5 comprises a five-axis milling process and forms an alternative manufacturing operation type to the manufacturing operation type MOT4. It can be given for example as follows:

$$E(MOT5) = g\ln(y+1+hy+i)$$

with different model parameters g, h, i

There are further manufacturing operation models MOpM for the other manufacturing operation types MOT as well, such as the manufacturing operation types MOT corresponding to MO2, MO3 and MO6 in the example of FIG. 6.

In a further step S2 of the computer-implemented method according to the present invention, measured contributions to key performance indicators KPI (i.e. efficiency function values EFV), process context data PCD and process execution data PED of the manufacturing operations MO can be provided. These can be collected in a possible embodiment during manufacturing processes MP having been executed to manufacture product variants PV of the same product family PF.

PCD:
MO1.MOT=drilling, MO2.MOT=assembly1, MO3.MOT=assembly2, MO4.MOT=3 axis milling, MO5.MOT=5 axis milling, MO6.MOT=assembly3.
MP(PVA)=MO1,MO2,MO3,MO4 or MO5 (alternative production variants PDV)
MP(PVB)=MO1,MO2,MO3,MO4 or MO5
MP(PVC)=MO1,MO2,MO3,MO4 or MO5
MP(PVD)=MO1,MO6, MO4 or MO5
PED:
MO1(PVA).xA=1.0
MO1(PVB).xB=3.0
MO1(PVC).xC=6.0
MO1(PVD).xD=2.0
Measured efficiency function values EFV (MO1 contribution only):
MO1(PVA).E=1.2
MO1(PVB).E=9.2
MO1(PVC).E=37.4
MO1(PVD).E=4.3

Figure 7:
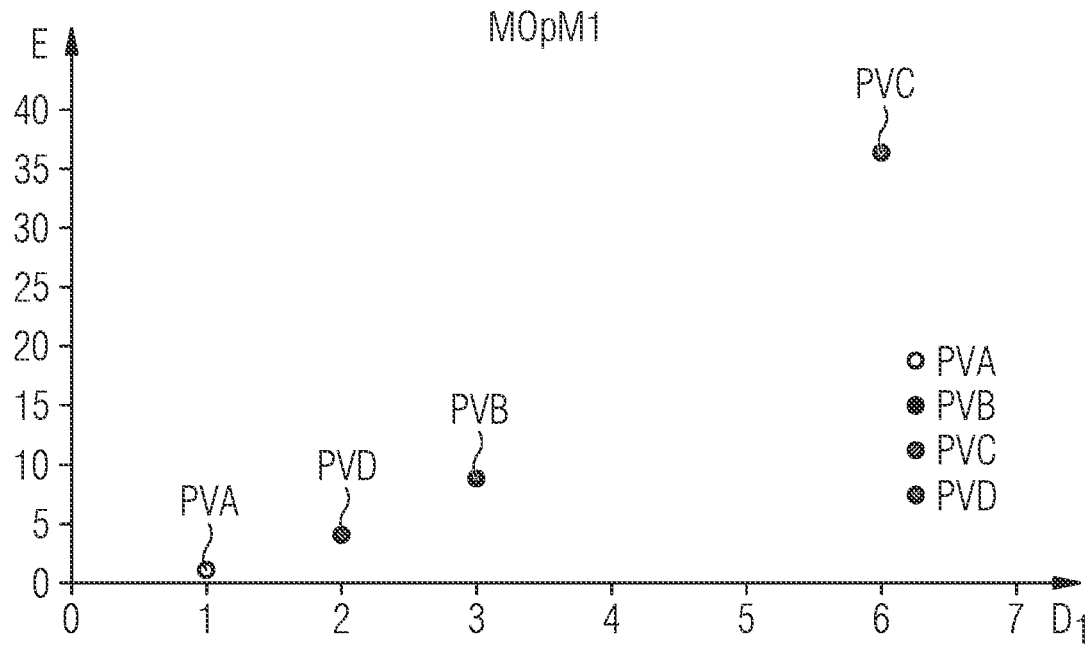

FIG. 7 illustrates the energy consumption E as an efficiency function EF of the manufacturing operation type MOT1 (drilling) for different drilling depths D1 for the different product variants PV-A, PV-B, PV-C and PV-D. As can be seen, the energy consumption E for the product variant PV-C is highest.

Figure 8:
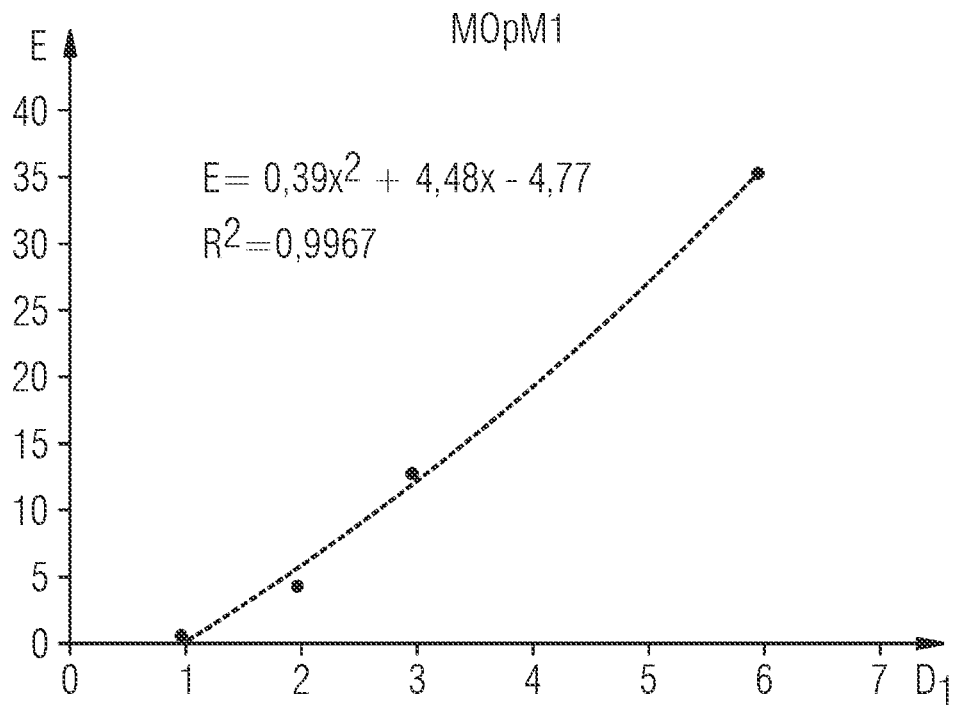

In a further step S3, the model parameters p of the provided manufacturing operation models MOpM are learned based on the measured efficiency function values EFV, the collected process context data PCD and the collected process execution data PED to update the manufacturing operation models MOpM. FIG. 8 illustrates the energy consumption E for the manufacturing operation type MOT1 (drilling) for different drilling depths D1. The updated manufacturing operation model MOpM' provides updated parameters a, b, c as follows:

$$a = 0.39,$$
$$b = 4.48,$$
$$c = -4.77.$$

Accordingly, FIG. 8 illustrates the learning step S3 of the computer-implemented method according to the present invention. A minimum of three measurements is of course required to obtain a first estimate of the three model parameters when using the regression method.

In a further step S4, the updated manufacturing operation models MOpM provided by step S3 are used to calculate predictions of key performance indicators $\widehat{KPI}$ of the product variant PV to be manufactured by the complex manufacturing system MSYS depending on a product configuration of the respective product variant PV. The production efficiency model PEM comprising the manufacturing models MM, in turn related to the manufacturing operation models MOpMs of manufacturing operation types MOT used for manufacturing the respective product variant PV is updated in response to the update of the manufacturing operation models MOpMs. The updated production efficiency model PEM' is evaluated to calculate automatically the predictions of the relevant key performance indicators $\widehat{KPI}$.

Figure 9:
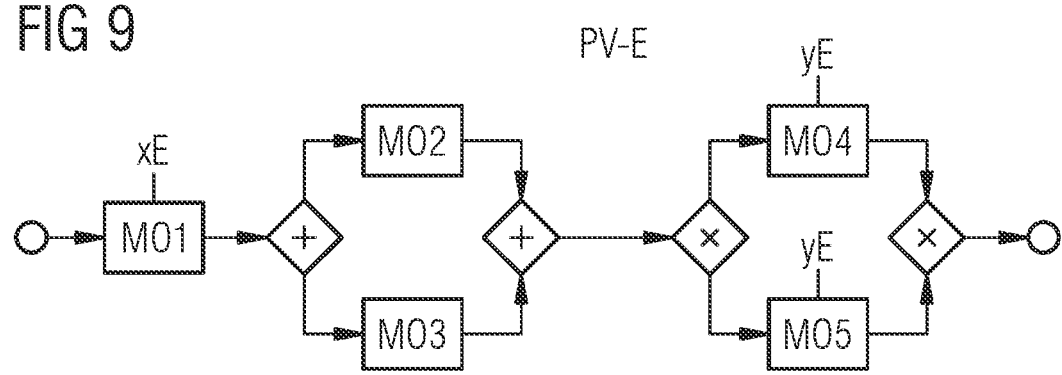
Figure 10:
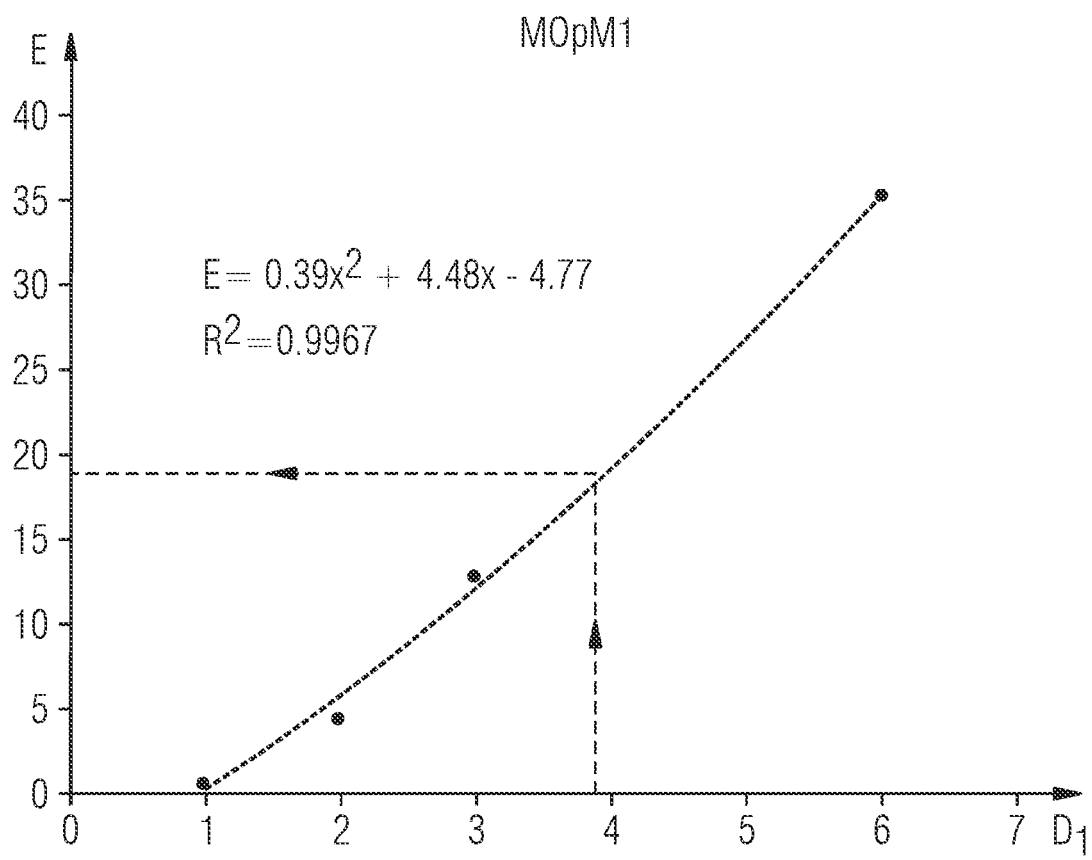

FIG. 9 illustrates the manufacturing of a new product variant PV-E with xE=3.9 (process execution data PED) having a predicted energy consumption for manufacturing operation MO1 of E(MO1)=18.6. The total energy consumption E is the sum of the contributions from the manufacturing operations MO1 to MO4 or MO5, with the contributions for MO2 . . . MO5 obtained in an analogous fashion. Accordingly, the updated manufacturing operation model MOpM' illustrated in FIG. 8 is used to calculate the energy consumption E of the manufacturing operation MO1 as illustrated in FIG. 10 for a certain drilling depth D1.

In a further step, key performance indicators $\widehat{KPI}$ predicted for different product variants PV of the same product family PF can be evaluated to assist in the selection of a production variant PDV or a product variant PV manufactured by the complex manufacturing system.

Figure 11:
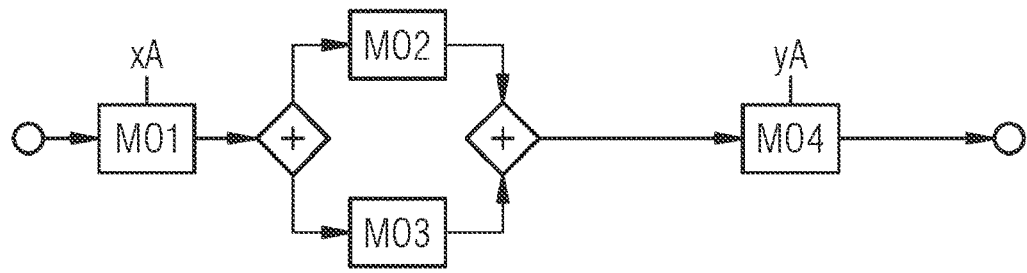

FIG. 11 illustrates the manufacturing of the product variant PV-A with the manufacturing operation MO4 (three-axis milling).

Figure 12:
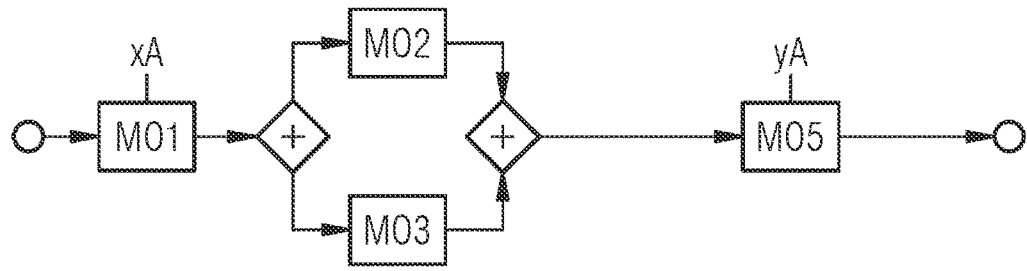

FIG. 12 illustrates the production of a same product variant PV-A with the manufacturing operation MO5 (five-axis milling).

Figure 13:
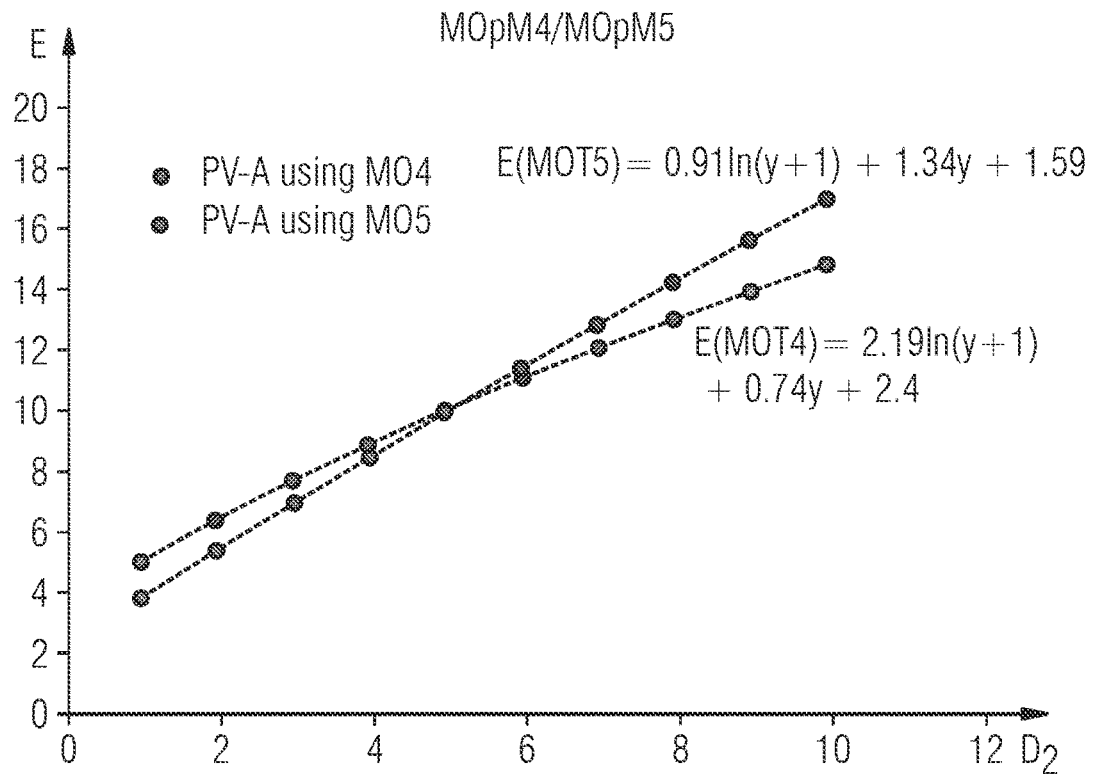

FIG. 13 illustrates the energy consumption E for producing the product variant PV-A using either the manufacturing operation MO4 as shown in FIG. 11 or the manufacturing operation MO5 as illustrated in FIG. 12 as a function of the milling depth D2.

It can be seen from FIG. 13 that in order to minimize energy consumption, for small milling depths D2 the five-axis milling (MOT5) should be used. Instead, for large milling depths D2, three-axis milling (MOT4) shall be used. The present invention can be used to automatically select, according to the milling depth D2, the best production variant PDV and direct the complex manufacturing system MSYS accordingly, using the interface to MES and the interface between MES and the physical production system. In general, there can of course be more than one different manufacturing operation type MOT distinguishing different production variants PDV.

LIST OF REFERENCE SIGNS

PV Product Variant
PDV Production variant PDV
PF Product Family
MO Manufacturing Operation
MSYS Manufacturing System
MOpM Manufacturing Operation Model
PU Processing Unit
PED Process Execution Data
PEM Production Efficiency Model
PCD Process Context Data
PLM Product Lifecycle Management
MES Manufacturing Execution System
MSF Manufacturing Shop Floor
KPI Key Performance Indicator
MP Manufacturing Process
EF Efficiency Function
EFV Efficiency Function Value

The invention claimed is:

1. A computer-implemented method for increasing production efficiency of a complex manufacturing system, the method configured for providing predictions of key performance indicators of a product variant of a product family to be manufactured by machines of the complex manufacturing system in a manufacturing process, which comprises the steps of:
  providing a processing unit of the complex manufacturing system with a manufacturing operation model for each manufacturing operation type used to manufacture the product variant of the product family;
  providing, via the complex manufacturing system, measured contributions to the key performance indicators, process context data and process execution data of manufacturing operations;
  learning automatically, via the processing unit, model parameters of manufacturing operation models based on the process context data collected, the process execution data collected, and the measured contributions to the key performance indicators to update the manufacturing operation models, the learning of the model parameters of the manufacturing operation models includes an iterative adaption of the model parameters which uses a neural network, decision trees or a support vector machine;
  evaluating an updated production efficiency model combining updated manufacturing models including updated manufacturing operation models to calculate predictions of the key performance indicators of the product variant to be manufactured by the complex manufacturing system depending on a product configuration of a respective product variant, wherein the key performance indicators predicted for different production variants of a same product variant are evaluated to select automatically by the complex manufacturing system, a most efficient production variant; and
  manufacturing by the complex manufacturing system a product variant according to a selected production variant.

2. The computer-implemented method according to claim 1, which further comprises evaluating the key performance indicators, predicted for the different product variants of a same product family, to select the product variant to be manufactured by the complex manufacturing system.

3. The computer-implemented method according to claim 1, which further comprises collecting the measured contributions to the key performance indicators, the process context data and the process execution data, during the manufacturing processes having been executed to manufacture the product variants of a same product family.

4. The computer-implemented method according to claim 1, wherein the key performance indicators depend on efficiency function values measured during manufacturing of the product variant.

5. The computer-implemented method according to claim 3, wherein the process context data collected during the manufacturing process to manufacture the product variant of the same product family comprise:
- a sequence and structure of the manufacturing operations performed during a respective manufacturing process;
- a configuration of the product variant manufactured by a sequence of the manufacturing operations; and
- time context data indicating a time when the manufacturing process of the product variant of the same product family was executed.

6. The computer-implemented method according to claim 1, wherein the process execution data of the manufacturing operation model contains continuous and/or discrete variables.

7. The computer-implemented method according to claim 1, which further comprises during the manufacturing operation, providing the specific contributions to the key performance indicators and the process execution data by a manufacturing execution system of the complex manufacturing system.

8. The computer-implemented method according to claim 7, which further comprises deriving the measured contributions to the key performance indicators, provided by the manufacturing execution system of the complex manufacturing system, from measurement data provided by sensors of the complex manufacturing system.

9. The computer-implemented method according to claim 5, which further comprises providing the sequence and structure of the manufacturing operations forming part of the process context data via a product lifecycle management system of the complex manufacturing system.

10. The computer-implemented method according to claim 1, which further comprises adapting the model parameters iteratively by performing a regression procedure.

11. The computer-implemented method according to claim 1, which further comprises providing the neural network as a feedforward neural network or a recurrent neural network.

12. The computer-implemented method according to claim 1, wherein the manufacturing process contains at least one manufacturing process cycle providing data combined to adapt the model parameters of the manufacturing operation model, or used to adapt the model parameters of the manufacturing operation model for each manufacturing process cycle.

* * * * *